United States Patent
Lee et al.

(10) Patent No.: US 11,423,718 B2
(45) Date of Patent: Aug. 23, 2022

(54) ELECTRONIC DEVICE AND METHOD FOR PROVIDING KEY

(71) Applicant: Samsung Electronics Co., Ltd., Suwon-si (KR)

(72) Inventors: Hojung Lee, Suwon-si (KR); Hyunsoo An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 16/970,322

(22) PCT Filed: Jan. 21, 2019

(86) PCT No.: PCT/KR2019/000809
§ 371 (c)(1),
(2) Date: Aug. 14, 2020

(87) PCT Pub. No.: WO2019/160250
PCT Pub. Date: Aug. 22, 2019

(65) Prior Publication Data
US 2021/0082215 A1    Mar. 18, 2021

(30) Foreign Application Priority Data
Feb. 14, 2018  (KR) .......... 10-2018-0018339

(51) Int. Cl.
*G07C 9/00* (2020.01)
*G06F 3/0484* (2022.01)
*G06F 3/04883* (2022.01)

(52) U.S. Cl.
CPC ....... *G07C 9/00309* (2013.01); *G06F 3/0484* (2013.01); *G06F 3/04883* (2013.01); *G07C 2009/00769* (2013.01)

(58) Field of Classification Search
CPC ...... G07C 9/00309; G07C 2009/00769; G07C 9/00571; G07C 2009/00865;
(Continued)

(56) References Cited

U.S. PATENT DOCUMENTS

| 7,937,070 B2 * | 5/2011 | Stendal .............. G07C 9/00182 340/5.1 |
| 8,354,913 B2 * | 1/2013 | Solomon ................... H02J 7/00 320/108 |

(Continued)

FOREIGN PATENT DOCUMENTS

| JP | 20112-56561 A | 12/2011 |
| KR | 10-2016-0147340 A | 12/2016 |

(Continued)

OTHER PUBLICATIONS

International Search Report and Written Opinion of the International Searching Authority in connection with International Application No. PCT/KR2019/000809 dated May 7, 2019, 11. pages.

*Primary Examiner* — Hai Phan
*Assistant Examiner* — Son M Tang

(57) ABSTRACT

Various embodiments of the present invention relate to an electronic device and method for providing information on a key related to a door lock. According to the various embodiments, the electronic device comprises: a touchscreen display; a wireless communication circuit; a location detection sensor; at least one processor operatively connected to the display, the wireless communication circuit, and the location detection sensor; and a memory operatively connected to the processor, wherein the memory can store instructions causing, when executed, the processor to provide a user interface (UI) on the display, select, on the partial basis of at least one piece of data from the wireless communication circuit and/or the location detection sensor, a first key from among a plurality of electronic keys used for (Continued)

respectively opening one of a plurality of door locks, and display a first graphic user interface (GUI) related to the selected first key in order to be used or selected by a user input.

8 Claims, 16 Drawing Sheets

(58) Field of Classification Search
CPC ............ G07C 2209/63; G07C 9/00817; G07C 9/00182; G07C 2009/00825; G06F 3/0484; G06F 3/04883
See application file for complete search history.

(56) References Cited

U.S. PATENT DOCUMENTS

| | | | |
|---|---|---|---|
| 8,943,187 B1* | 1/2015 | Saylor | G07C 9/00571 709/225 |
| 9,483,887 B1* | 11/2016 | Soleimani | G07C 9/00571 |
| 10,434,988 B2* | 10/2019 | Gennermann | B60R 25/241 |
| 11,234,103 B2* | 1/2022 | Choi | H04W 64/006 |
| 2002/0180582 A1* | 12/2002 | Nielsen | G07C 9/21 340/5.6 |
| 2004/0203379 A1* | 10/2004 | Witkowski | H04L 12/66 455/41.2 |
| 2007/0005975 A1* | 1/2007 | Bauchot | G06F 3/04817 713/171 |
| 2007/0030963 A1* | 2/2007 | Wyld | G06F 21/6218 380/44 |
| 2007/0096866 A1* | 5/2007 | Denison | H04L 9/3271 340/5.23 |
| 2008/0149711 A1* | 6/2008 | Griffits | E05B 19/24 235/385 |
| 2010/0161720 A1* | 6/2010 | Colligan | H04W 4/02 711/E12.002 |
| 2011/0050391 A1* | 3/2011 | Denison | G07C 9/00912 340/5.51 |
| 2011/0060480 A1* | 3/2011 | Mottla | G07C 9/00571 701/2 |
| 2011/0084797 A1* | 4/2011 | Narayanan | G06Q 10/06 700/236 |
| 2012/0280790 A1* | 11/2012 | Gerhardt | H04M 1/72415 340/5.61 |
| 2013/0085796 A1* | 4/2013 | Ruffolo | G06Q 10/06 705/7.18 |
| 2013/0086481 A1* | 4/2013 | Balasaygun | G06F 3/0482 715/745 |
| 2013/0321178 A1* | 12/2013 | Jameel | H04W 4/40 340/989 |
| 2013/0335193 A1* | 12/2013 | Hanson | G07C 9/00174 340/5.61 |
| 2014/0053108 A1* | 2/2014 | Johansson | H04M 1/67 715/846 |
| 2014/0120905 A1* | 5/2014 | Kim | H04W 4/80 455/426.1 |
| 2014/0266585 A1* | 9/2014 | Chao | H04W 4/33 340/5.61 |
| 2014/0320261 A1* | 10/2014 | Davis | G07C 9/20 340/5.61 |
| 2014/0353983 A1* | 12/2014 | Vetter | E05C 3/042 292/197 |
| 2014/0373111 A1* | 12/2014 | Moss | H04W 12/08 726/5 |
| 2015/0102899 A1* | 4/2015 | Kim | G08C 17/06 340/5.7 |
| 2015/0221152 A1* | 8/2015 | Andersen | G07C 9/27 340/5.22 |
| 2015/0363986 A1* | 12/2015 | Hoyos | H04L 63/0861 340/5.61 |
| 2016/0063847 A1* | 3/2016 | Hawkins | G08B 21/0277 340/539.11 |
| 2016/0092066 A1* | 3/2016 | Jeon | G06F 3/0484 705/14.66 |
| 2016/0133071 A1* | 5/2016 | Henderson | G07C 9/0069 70/277 |
| 2016/0196706 A1* | 7/2016 | Tehranchi | H04W 4/80 340/5.61 |
| 2016/0300410 A1* | 10/2016 | Jones | B60R 25/2045 |
| 2016/0364135 A1* | 12/2016 | Park | G06Q 20/36 |
| 2016/0364927 A1* | 12/2016 | Barry | H04L 63/10 |
| 2016/0368455 A1* | 12/2016 | Kim | B60R 25/23 |
| 2017/0050617 A1* | 2/2017 | Penilla | B60R 25/2018 |
| 2017/0093829 A1* | 3/2017 | Gitlin | H04L 63/08 |
| 2017/0136990 A1* | 5/2017 | Tercero | B60R 25/01 |
| 2018/0025564 A1* | 1/2018 | Lai | G07C 9/21 340/5.61 |
| 2018/0220429 A1* | 8/2018 | Hazebrouck | G07C 9/00309 |
| 2018/0225780 A1* | 8/2018 | Boss | H04W 12/68 |
| 2019/0012860 A1* | 1/2019 | Lee | H04W 4/00 |
| 2019/0065732 A1* | 2/2019 | Woo | G06F 21/44 |
| 2020/0020188 A1* | 1/2020 | Shin | H04L 67/18 |
| 2020/0051354 A1* | 2/2020 | Lopez | H04W 4/023 |
| 2020/0143611 A1* | 5/2020 | Shin | G06Q 20/40 |
| 2021/0201609 A1* | 7/2021 | Amuduri | G07C 9/37 |

FOREIGN PATENT DOCUMENTS

| | | |
|---|---|---|
| KR | 10-2017-0050501 A | 5/2017 |
| KR | 10-2017-0078415 A | 7/2017 |
| KR | 10-2018-0075920 A | 7/2018 |
| KR | 10-2018-0105819 A | 10/2018 |
| KR | 10-2019-0024169 A | 3/2019 |
| WO | 2018124741 A1 | 7/2018 |

* cited by examiner

ELECTRONIC DEVICE AND METHOD FOR PROVIDING KEY

CROSS-REFERENCE TO RELATED APPLICATIONS

This application is a 371 National Stage of International Application No. PCT/KR2019/000809, filed Jan. 21, 2019, which claims priority to Korean Patent Application No. 10-2018-0018339, filed Feb. 14, 2018, the disclosures of which are herein incorporated by reference in their entirety.

BACKGROUND

1. Field

Various embodiments relate to an electronic device and a method for providing a key associated with a door-lock.

2. Description of Related Art

With the development of technology for electronic devices, electronic devices may provide various services. An electronic device may provide a key service for unlocking a door-lock by using information stored in the electronic device. The key service may refer to a service for controlling a door-lock by using an electronic key. The electronic device may control to unlock the door-lock by transmitting information on a key of the door-lock, based on communication with the door-lock.

The electronic device may include information on a plurality of door-locks related to the key service, and information on a plurality of keys related to the plurality of door-locks. The electronic device may arrange and display the information on the plurality of keys to provide the key service.

SUMMARY

An electronic device may provide information on a plurality of keys by displaying the information on the plurality of keys. For example, the electronic device may list and provide the information on the plurality of keys in sequence of respective names (or spellings) of the keys. In this case, the electronic device may have a problem that a user should directly find a key which is fit for user's purpose from among the plurality of keys to receive a final key service.

Various embodiments provide an electronic device and a method for providing information on at least one key from among a plurality of keys, based on a state of the electronic device.

The technical object to be achieved by the disclosure is not limited to that mentioned above, and other technical objects that are not mentioned above may be clearly understood to those skilled in the art based on the description provided below.

According to various embodiments, an electronic device may include a touchscreen display, a wireless communication circuit, a location detection sensor, at least one processor operatively connected with the display, the wireless communication circuit, and the location detection sensor, and a memory operatively connected with the processor, and the memory may store instructions that, when executed, cause the processor to: provide a user interface (UI) on the display; based at least in part on data from at least one of the wireless communication circuit and the location detection sensor, select a first key from a plurality of electronic keys which are used to open one of a plurality of door-locks, respectively; and display a first graphic user interface (GUI) related to the selected first key in order to make the first key be used or selected by a user input.

According to various embodiments, an electronic device may include a communication module; a memory configured to store instruction; and a processor operatively coupled with the memory, and the processor may be configured to execute the stored instructions to: identify that a state of the electronic device related to at least one of a plurality of door-locks interlocking with the electronic device is changed; based on the identifying, change at least one electronic key to be displayed through a UI from among a plurality of electronic keys for unlocking the plurality of door-locks, respectively; and display at least one visual object for indicating the at least one changed electronic key through the UI.

According to various embodiments, a method of an electronic device may include: identifying that a state of the electronic device related to at least one of a plurality of door-locks interlocking with the electronic device is changed; based on the identifying, changing at least one electronic key to be displayed through a UI from among a plurality of electronic keys for unlocking the plurality of door-locks, respectively; and displaying at least one visual object for indicating the at least one changed electronic key through the UI.

The electronic device and the operating method thereof according to various embodiments can provide an enhanced user experience by identifying and providing a key suitable for a state of the electronic device from among a plurality of keys set in the electronic device.

The effects that can be achieved by the disclosure are not limited to those mentioned above, and other effects that are not mentioned above may be clearly understood to those skilled in the art based on the description provided below.

DETAILED DESCRIPTION

Figure 1:
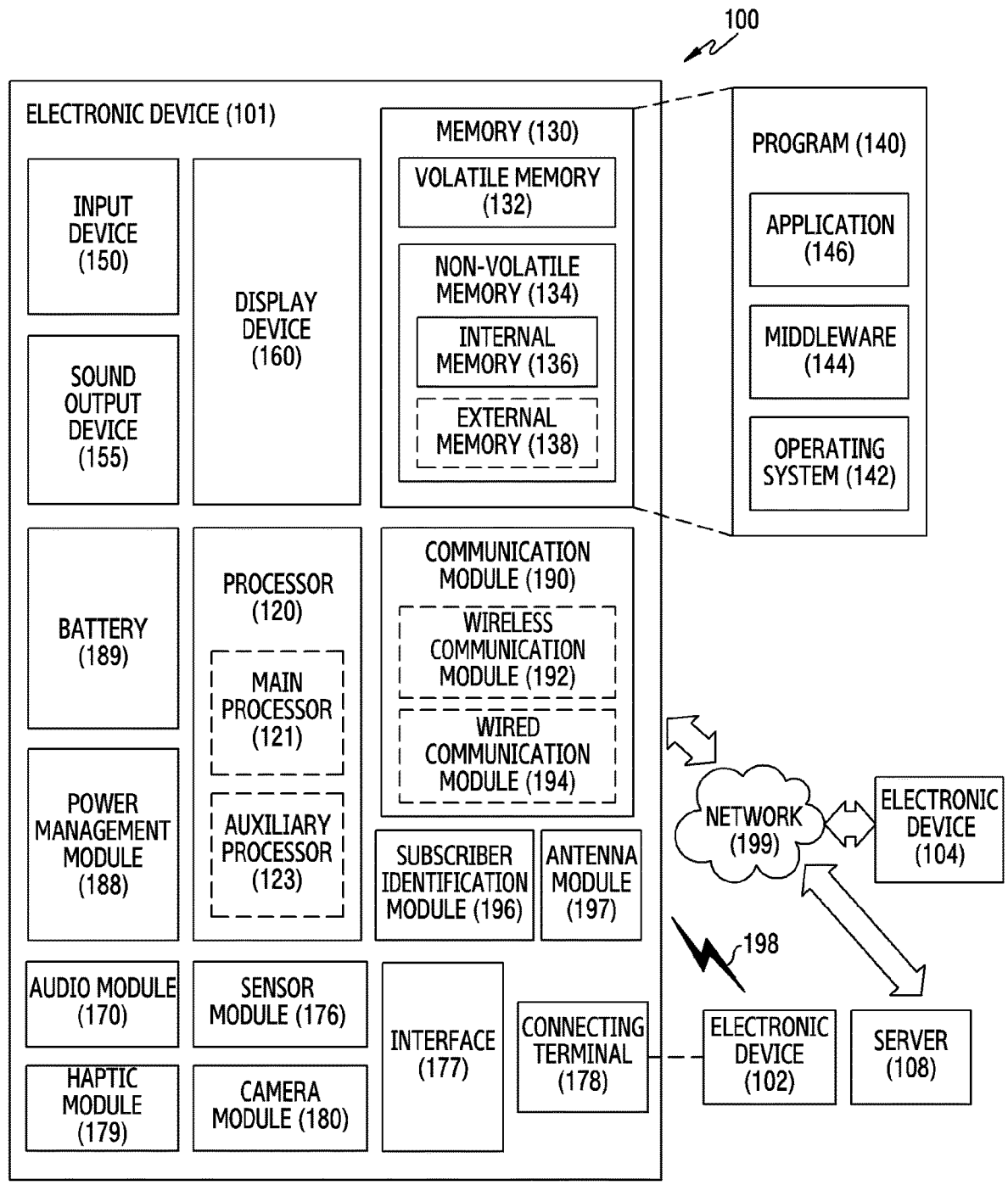
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. In various embodiments, at least one sensor included in the sensor module 176 may be used to detect the location of the electronic device 101. In various embodiments, the at least one sensor for detecting the position of the electronic device 101 may be referred to as a position detection sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. The camera module 180 may be composed of a plurality of cameras, for example, a first camera and a second camera.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may include one or more antennas for transmitting a signal or power to the outside or receiving it from the outside. According to an embodiment, the communication module 190 (e.g., the wireless communication module 192) may transmit a signal to an external electronic device through an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
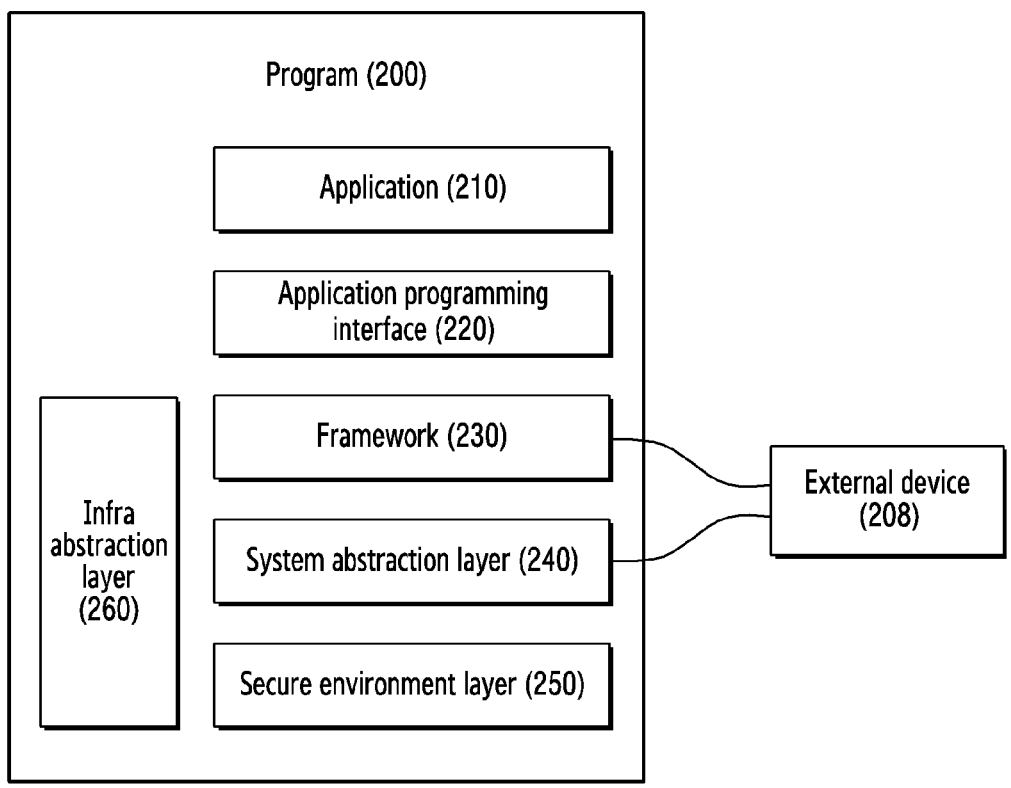
FIG. 2 is a view illustrating an example of a functional configuration of an electronic device and a server according to various embodiments.

FIG. 2 is a block diagram of a program module 200 (for example, the program 140) according to various embodiments.

Referring to FIG. 2, an electronic device (for example, the electronic device 101) may operate based on the program module 200, and may communicate with an external device 208 (for example, the electronic device 102, 104, the server 108). The program module 200 may include an application 210 (for example, the application 146), an application programming interface (API) 220, a framework 230, a system abstraction layer 240, a secure environment layer 250, and an infra abstraction layer 260. At least a part of the program module 200 may be pre-loaded on the electronic device or may be downloaded from the external device 208.

The application 210 may be provided to visually use or manage an electronic key in the electronic device. The application 210 may include a graphic user interface (GUI) associated with the electronic key. The application programming interface 220 may provide all functions related to the electronic device through an integrated interface. For example, the application programming interface 220 is a set of APIs, that is, a set of application programming functions, and may be configured differently according to an operating system (for example, the operating system 142). The framework 230 may provide interoperability between the external device 208 and the application programming interface 220. The framework 230 may communicate with the external device 208 (for example, the electronic device 104, the server 108) which provides a service related to the electronic key. The system abstraction layer 240 may provide interoperability between the external device 208 and the secure environment layer 250. The system abstraction layer 240 may communicate with the external device 208 which provides a service related to security of the electronic key. The secure environment layer 250 may provide a security-strengthened storage environment based on hardware or software. The infra abstraction layer 250 may communicate with an external electronic device (for example, the electronic device 102) to use the electronic key. The external electronic device may include a door-lock. For example, the door-lock may be attached to doors of a building, a room, a vehicle, a storage box.

The external device 208 may provide the service related to the electronic key and the service related to the security of the electronic key. The external device 208 may manage information related to a user of the electronic device and the electronic key, and a provider of the electronic key. The external device 208 may provide a secure protocol for security of the electronic key. According to an embodiment, the external device 208 may provide both the service related to the electronic key and the service related to the security of the electronic key. According to another embodiment, the external device 208 may include a first server for the service related to the electronic key, and a second server for the service related to the security of the electronic key.

According to various embodiments, key information and credential information may be defined in relation to the electronic key of the door-lock. The key information is information associated with the electronic key and may indicate attribute information of the electronic key. The credential information may indicate a confidence value that is given to the electronic key to verify a credential to control the door-lock. For example, the credential information may include at least one of a password, a certificate, or an authentication key. The key information and the credential information may include identification information of the electronic key, and may be mapped onto each other based on the identification information of the electronic key.

According to various embodiments, the electronic device may control the door-lock by using the credential information. When the credential information does not exist in the electronic device, the electronic device may not be able to control the door-lock by using the electronic key. When the credential information exists in the electronic device, the electronic device may be able to control the door-lock by using the electronic key. For example, the electronic device may control at least one of opening, closing or initializing the door-lock.

Figure 3:
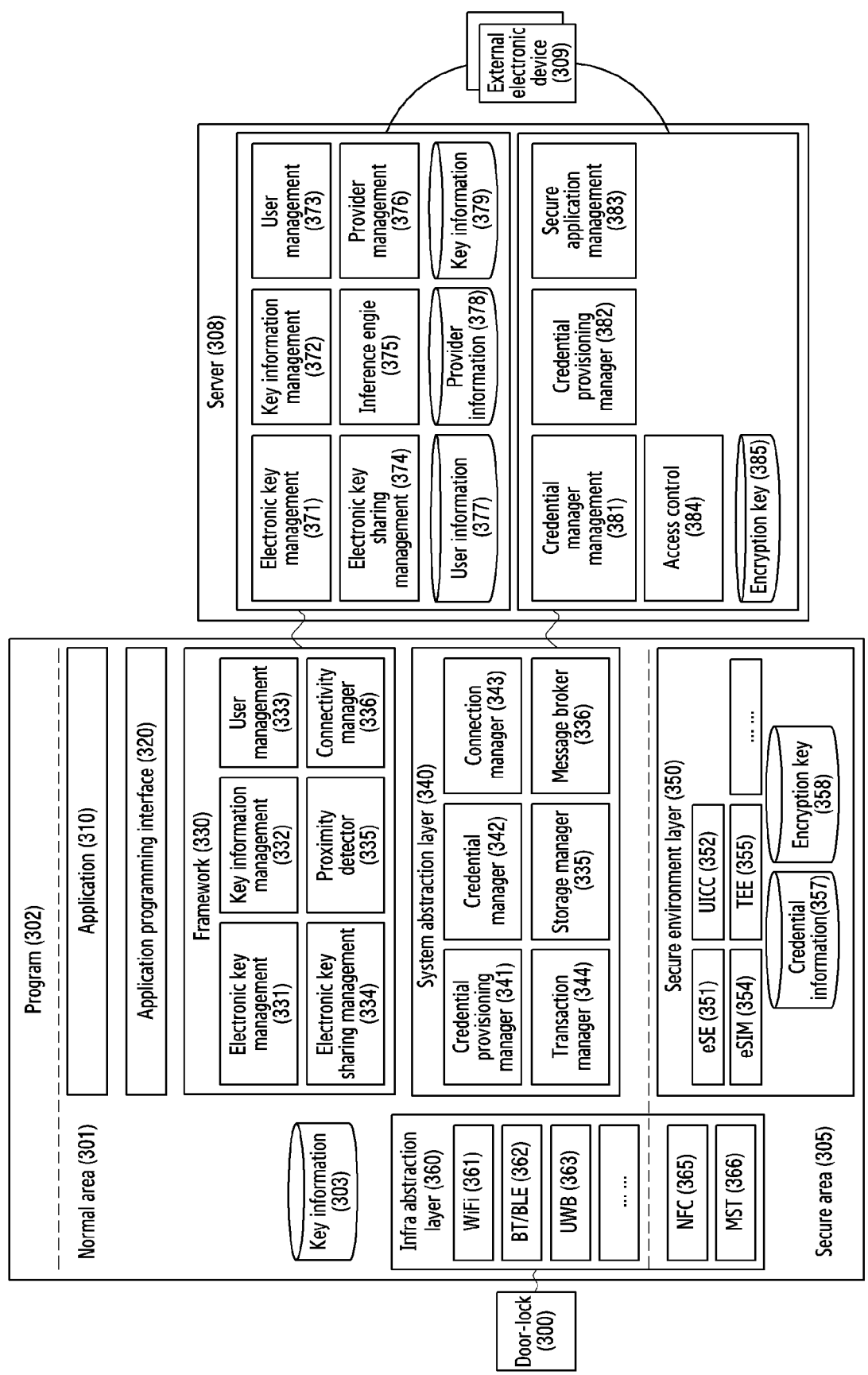
FIG. 3 is a view illustrating another example of a functional configuration of an electronic device and a server according to various embodiments.

FIG. 3 is a block diagram of a program module 302 (for example, the program 140, the program module 200) according to various embodiments.

Referring to FIG. 3, an electronic device (for example, the electronic device 101) may operate based on the program module 302, and may communicate with a door-lock 300 (for example, the electronic device 102) and an external device 308, 309. The external device 308, 309 may include a server 308 (for example, the server 108, the external device 208), and an external electronic device 309 (for example, the electronic device 104). The server 308 may provide a service to the electronic device by communicating with the external electronic device 309. The external electronic device 309 may be an electronic device of a provider configured to manufacture or manage the door lock 300, or a provider providing a service related to an electronic key, such as a hotel, a car rental agent, a customer of a delivery service, and may provide credential information of the electronic key.

The program module 302 may be configured with a normal area 301 and a secure area 305. The program module 302 may include an application 310 (for example, the application 146, the application 210), an application programming interface 320 (for example, the application programming interface 220), a framework 330 (for example, the framework 230), a system abstraction layer 340 (for example, the system abstraction layer 240), a secure environment layer 350 (for example, the secure environment layer 250), and an infra abstraction layer 360 (for example, the infra abstraction layer 260). The application 310, the application programming interface 320, the framework 330, and the system abstraction layer 240 may be provided in the normal area 301, and the secure environment layer 350 may be provided in the secure area 305. The infra abstraction layer 360 may be provided in at least one of the normal area 301 or the secure area 305.

Key information 303 may be stored in the normal area 301. The key information 303 may include at least one of identification information of an electronic key, identification information of the electronic device (for example, the electronic device 101), identification information of the door-lock 300, a communication method of the electronic key, a name of the electronic key, an identifier of the electronic key according to a provider, time data of the electronic key, location data of the electronic key, or state information of the electronic key. The communication method of the electronic key refers to a communication method between the electronic device for using the electronic key, and the door-lock 300, and, for example, may be determined as at least one of wireless fidelity (WiFi), Bluetooth/Bluetooth low energy (BT/BLE), ultra wide band (UWB), near field communication (NFC), or magnetic secure transmission (MST). The name of the electronic key may be displayed on a graphic user interface, and may be determined to be grasped by the user. The identifier of the electronic key may be determined, for example, according to a business type of the provider. The time data of the electronic device may indicate an expiry period of the electronic key, and for example, may include a starting point and an end point. The location data of the electronic key may indicate a location where the electronic key is usable, and may include a latitude and a longitude of the door-lock 300. The state information of the electronic key may indicate the presence/absence of credential information corresponding to the electronic key in the electronic device, and may be determined as any one of a disabled state or an enabled state, for example.

The framework 330 may include an electronic key management 331, a key information management 332, a user management 333, an electronic key sharing management 334, a proximity detector 335, and a connectivity management 336. The electronic key management 331 may manage the electronic key. The electronic key management 331 may provide binding of a communication method of each electronic key, a storage location, an issuance state indicating issuance completion or issuance waiting, door-lock information. The key information management 332 may manage the key information 303. The user management 333 may manage information related to the user. The user management 333 may manage at least one of identification information of the electronic device or account information of the user. The electronic key sharing management 334 may share the electronic key with an external electronic device (for example, the electronic device 102, 104). The proximity detector 335 may detect the door-lock 300 within a predefined radius. The proximity detector 335 may detect a distance between the electronic device and the door-lock 300. The connectivity management 336 may manage a session regarding a wireless connection of the electronic device. The connectivity management 336 may manage a session regarding at least one of a connection between the electronic device and the door-lock 300 or a connection between the electronic device and the server 308 (for example, the external device 208).

The system abstraction layer 340 may include a credential provisioning manager 341, a credential manager 342, a connection manager 343, a transaction manager 344, a storage manager 345, and a message broker 346. The credential provisioning manager 341 may generate and manage an encryption key 358 for security of credential information 357. The credential provisioning manager 341 may transmit the encryption key 358 to the secure environment layer 350. The credential manager 342 may manage the credential information 357. The credential manager 342 may receive the credential information 357 from the server 308, and may transmit the credential information to the secure environment layer 350. The connection manager 343 may manage connection resources for the electronic device. The connection manager 343 may connect or delete a session with at least one of the door-lock 300 or the server 308. The transaction manager 344 may trace a transaction regarding use and transmission of the credential information. The storage manager 345 may determine an area for managing the credential information 357 in the secure environment layer 250. The storage manager 345 may store the credential information 357 in the secure environment layer 250, or may request the stored credential information 357. The message broker 346 may provide a secure protocol between the system abstraction layer 340 and the server 308.

The secure environment layer 350 may provide a security-strengthened storage environment based on hardware or software. For example, the storage environment may include at least one of an embedded secure element (eSE) 351, a universal integrated circuit card (UICC) 352, an embedded subscriber identity module (eSIM) 354, or a trusted execution environment (TEE) 355. In various embodiments, the TEE 355 may be used to store the credential information 37 and the encryption key 358 while maintaining security. The secure environment layer 350 may store the credential information 357 of the electronic key and the encryption key 358. The credential information 357 may include identification information of the electronic key and a confidence value for verifying a credential to control the door-lock 300. The encryption key 358 may be used for security of the credential information 357.

The infra abstraction layer 360 may wirelessly communicate with the door-lock 300 to use the electronic key. For example, the wireless communication may include at least one of wireless fidelity (WiFi) 361, Bluetooth/Bluetooth low energy (BT/BLE) 362, ultra wide band (UWB) 363, near field communication (NFC) 364, or magnetic secure transmission (MST) 365. The WiFi 361, the BT/BLE 362, and the UWB 363 may be provided in the normal area 301, and the NFC 364 and the MST 365 may be provided in the secure area 305.

The server 308 may include an electronic key management 371, a key information management 372, a user management 373, an electronic key sharing management 374, an inference engine 375 and a provider management 376. The electronic key management 371 may manage the electronic key. The electronic key management 371 may provide binding of a communication method of each electronic key, a storage location, an issuance state indicating issuance completion or issuance waiting, door-lock information. The key information management 372 may manage key information 379 of each electronic key. The user management 373 may manage information related to the user. The user management 373 may manage at least one of identification information of the electronic device or account information of the user, and may provide single sign on (SSO). The electronic key sharing management 374 may share the electronic key with an external electronic device. The electronic key sharing management 374 may discover an external electronic device, and may provide the electronic key to the external electronic device. The inference engine 375 may recommend an electronic key to the electronic device. The inference engine 375 may recommend the electronic key to the electronic device, based on at least one of a distance between the electronic device and the door-lock 300, a location or time of the door-lock 300. The provider management 376 may manage information related to a provider 309 of the electronic key. The server 308 may store user information 377 of the electronic key, provider information 378, and the key information 379.

The server 308 may include a credential manager management 381, a credential provisioning manager 382, a secure application management 383, and an access control 384. The credential manager management 381 may manage the credential manager 342 of the electronic device. The credential provisioning manager 382 may generate and manage an encryption key 385 for security of credential information of each electronic key. The credential secure application management 383 may install and manage a secure application in the secure environment layer 350 of the electronic device. The access control 384 may manage connection resources for the electronic device. The access control 343 may connect or delete a session with the electronic device. The server 308 may store the encryption key 385.

In various embodiments, at least a part of the server 308 may be omitted although this is not illustrated. When at least a part of the server 308 is omitted, an operation of the server 308 related to the omitted at least part may be performed by the electronic device 101. According to various embodiments, the electronic device 101 may further include other components to perform the operation related to the omitted at least part. The electronic device 101 may perform the operation related to the omitted at least part by using the other components. For example, the server 308 may be omitted, and in this case, the inference engine 375 may be included in the electronic device 101. The electronic device 101 may identify a state of the electronic device 101 through the inference engine 375 included in the electronic device 101, and may determine a time to provide information on the key.

Figure 4:
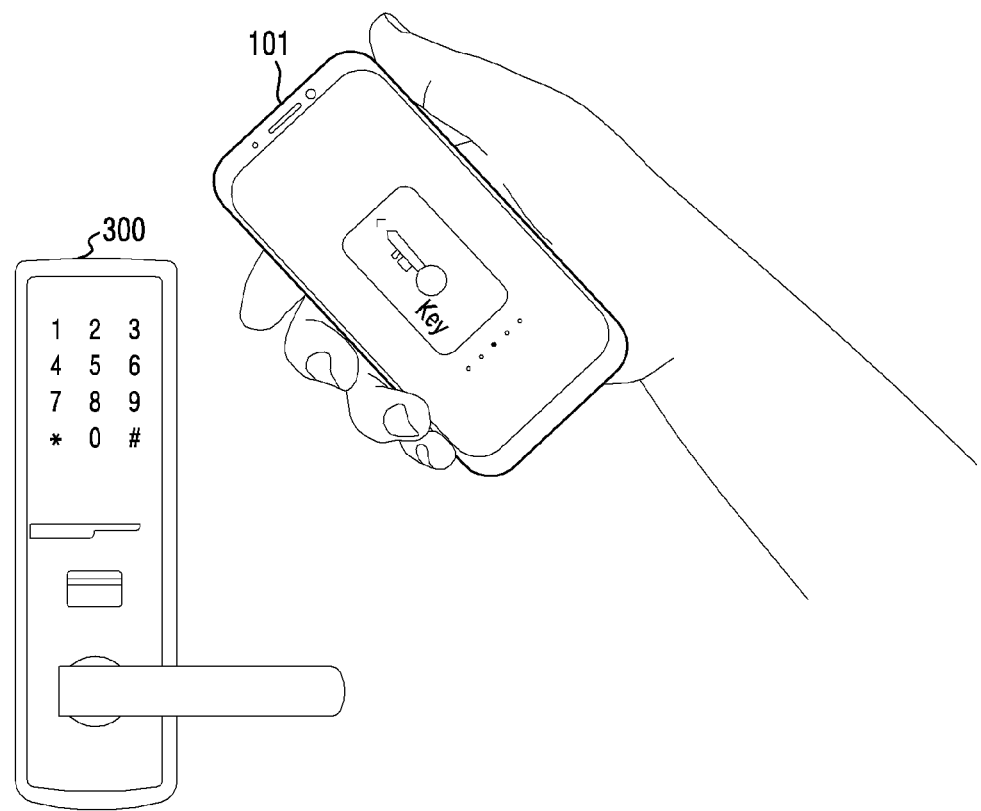
FIG. 4 is a view illustrating an example of usage of an electronic device according to various embodiments.

FIG. 4 is a view illustrating an example of usage of an electronic device according to various embodiments.

Referring to FIG. 4, the electronic device 101 may provide information on a key (or an electronic key) for unlocking the door-lock 300 to the door-lock 300 (or a locking device or a locking sensor). The information on the key is provided, such that the door-lock 300 can be unlocked, although this is not illustrated. Hereinafter, the door-lock 300 will be indicated in the singular form, but may include a plurality of door-locks according to embodiments.

In various embodiments, the electronic device 101 may include information on the door-lock 300 to control the door-lock 300. The information on the door-lock 300 may include, for example, information on at least one of a key for controlling the door-lock 300, a name of the door-lock 300, a location of the door-lock 300, or a type of the door-lock 300. According to various embodiments, the electronic device 101 may acquire the information on the door-lock 300. The electronic device 101 may acquire the information on the door-lock 300 by receiving a user input in a setting environment for providing a key service. In another example, the electronic device 101 may acquire the information on the door-lock 300 by receiving a user input, based on an application for providing the key service being initially executed. In still another example, the electronic device 101 may acquire the information on the door-lock 300 from a server (for example, the server 108, the server 308) (hereinafter, the server 108) related to the key service, based on a key application for providing the key service being installed. The electronic device 101 may acquire the information on the door-lock 300 through various pathways, and is not limited to the above-described examples.

In various embodiments, the electronic device 101 may provide the key service to unlock the door-lock 300, based on the information on the door-lock 300. The key service may include a service based on an application which stores and provides a key for unlocking the door-lock 300. The key service may be referred to as a smart key service or a key chain service, and is not limited to the above-described example.

In various embodiments, the electronic device 101 may provide information on a key to the door-lock 300. The electronic device 101 may control the door-lock 300 by providing the information on the key to the door-lock 300. The electronic device 101 may provide the information on the key to the door-lock 300, based on identification of the door-lock 300. In some embodiments, the electronic device 101 may identify the door-lock 300 based on a user input. For example, the electronic device 101 may identify the door-lock 300 based on a user input of selecting the door-lock 300 being detected. The electronic device 101 may provide the information on the key of the door-lock 300 by identifying information on a key associated with the identified door-lock 300. In some other embodiments, the electronic device 101 may identify the door-lock 300, based on information on a state of the electronic device 101 being acquired. The information on the state of the electronic device 101 may include, for example, information on a location of the electronic device 101, information on a connection state between the electronic device 101 and the door-lock 300, or information on a usage pattern related to the door-lock 300. The electronic device 101 may identify the door-lock 300 associated with the state of the electronic device 101. The electronic device 101 may provide the information on the key of the door-lock 300 by identifying the information on the key associated with the identified door-lock 300.

In various embodiments, the electronic device 101 may include information on a plurality of door-locks. In this case, the electronic device 101 may include information on a plurality of keys associated with the plurality of door-locks, respectively. The electronic device 101 may store the information on the plurality of door-locks while mapping (or associating) the information onto (with) the plurality of keys, respectively.

In various embodiments, when the electronic device 101 includes the information on the plurality of door-locks, the electronic device 101 may provide information on a key of at least one of the plurality of door-locks. The electronic device 101 may identify a state of the electronic device 101, and may provide the information on the key of at least one of the plurality of door-locks, based on the identified state. In some embodiments, the electronic device 101 may identify whether there exists the door-lock 300 connected with the electronic device 101. In response to there existing the door-lock 300 connected with the electronic device 101, the electronic device 101 may provide information on a key of the door-lock 300 connected with the electronic device 101. In some other embodiments, the electronic device 101 may identify a location of the electronic device 101. The electronic device 101 may identify whether the door-lock 300 is included within a designated range from the identified location. Based on the door-lock 300 being included within the designated range, the electronic device 101 may provide information on a key of the door-lock 300 included within the designated range. In some other embodiments, the electronic device 101 may include information on a usage pattern related to the door-lock 300. The electronic device 101 may provide the information on the key of the door-lock 300 by identifying the door-lock 300 based on the usage pattern.

In various embodiments, the electronic device 101 may store a history (or log) regarding usage of the key related to the door-lock 300. When the information on the plurality of door-locks is included in the electronic device 101, the electronic device 101 may store a usage history of each of the plurality of keys related to the plurality of door-locks, respectively. In some embodiments, the electronic device 101 may store information on a sequence of usage of at least some of the plurality of keys. For example, when a house key and an office key are used in sequence, the electronic device 101 may store sequence information indicating that the keys are used in sequence. The electronic device 101 may generate a usage pattern based on the stored sequence information. In some other embodiments, the electronic device 101 may store information on a point of time (or time) at which the information on the key is used, in response to the information on the key being used. The electronic device 101 may generate a usage pattern, based on the information on the point of time of use. In some other embodiments, in response to the information on the key being used, the electronic device 101 may store information on a use location of the information on the key. The electronic device 101 may acquire a usage pattern based on the stored information on the use location.

In various embodiments, the operations of the electronic device 101 described above may be performed through the processor 120. According to embodiments, the processor 120 may perform various operations for providing the key service, based on instructions stored in the memory 130 being executed.

In various embodiments, the door-lock 300 may include a device which is used for the purpose of controlling entering and exiting in various places. The door-lock 300 may be mounted and used on various places or things (for example, a house or a car) in addition to an office. For example, the door-lock 300 may be mounted on a door of an office, and may be used for the purpose of controlling locking of the door of the office. The door-lock 300 may be devices of various shapes or various types to provide a locking function, and is not limited to the above-described example.

In various embodiments, the door-lock 300 may indicate various devices including the locking function. The door-lock 300 is indicated in the singular form, but may be used as a term including a plurality of door-locks according to an embodiment, and is not limited to the above-described example. The key (or the plurality of keys) may be referred to as an electronic key (or a plurality of electronic keys). The key may be referred to as a term indicating information (or a value) for unlocking or locking the door-lock 300, and is not limited to the above-described example.

According to various embodiments, an electronic device 101 may include a touchscreen display, a wireless communication circuit, a location detection sensor; at least one processor 120 operatively connected with the display, the wireless communication circuit, and the location detection sensor; and a memory operatively connected with the processor 120, and the memory may store instructions that, when executed, cause the processor 120 to: provide a user interface (UI) on the display; based at least in part on data from at least one of the wireless communication circuit and the location detection sensor, select a first key from a plurality of electronic keys which are used to open one of a plurality of door-locks, respectively; and display a first graphic user interface (GUI) related to the selected first key in order to make the first key be used or selected by a user input.

In various embodiments, the instructions may cause the processor 120 to: display an entirety of the first GUI on the display; display a portion of a second GUI associated with a second key from among the plurality of electronic keys on the display; and display a portion of a third GUI related to a third key from among the plurality of electronic keys on the display.

In various embodiments, the instructions may cause the processor 120 to: receive a gesture input in a first direction from the first GUI to the second GUI through the display; and provide a scrolling effect for changing display of the first GUI to display of the second GUI.

In various embodiments, the instructions may cause the processor 120 to: receive a gesture input in a second direction from the first GUI to the third GUI through the display, the second direction being opposite to the first direction; and provide a scrolling effect for changing display of the first GUI to display of the third GUI.

In various embodiments, the data may include at least one of a strength indicator of a received signal, global positioning system (GPS) data, WiFi signal data, or Bluetooth or Bluetooth low energy (BLE) signal data.

In various embodiments, the instructions may cause the processor 120 to select the first key, based on at least one of a time or a previous usage history additionally or alternatively.

In various embodiments, the location detection sensor may include at least one of a GPS communication module, a WiFi communication module, or a biometric sensor.

In various embodiments, an electronic device 101 may include a communication module 190; a memory 130 configured to store instruction; and a processor 120 operatively coupled with the memory 130, and the processor 120 may be configured to execute the stored instructions to: identify that a state of the electronic device 101 related to at least one of a plurality of door-locks interlocking with the electronic device 101 is changed; based on the identifying, change at least one electronic key to be displayed through a UI from among a plurality of electronic keys for unlocking the plurality of door-locks, respectively; and display at least one visual object for indicating the at least one changed electronic key through the UI.

In various embodiments, the state of the electronic device 101 may include at least one of a state regarding a connection between at least one of the plurality of door-locks and the electronic device 101, and a state related to a location of the electronic device 101 or a usage pattern of the plurality of door-locks of the electronic device 101.

In various embodiments, the processor 120 may further be configured to execute the stored instructions to: transmit a signal for requesting information on an electronic key of at least one of the plurality of door-locks to a server 108, based on the state of the electronic device 101; and change at least one electronic key to be displayed through the UI, based on the information on the at least one electronic key being received from the server 108.

In various embodiments, the processor 120 may further be configured to execute the stored instructions to: identify whether there exists a door-lock that interlocks with the electronic device 101; and display an electronic key related to the door-lock 300 interlocking with the electronic device from among the plurality of electronic keys through the UI, based on there existing the door-lock that interlocks with the electronic device 101.

In various embodiments, the processor 120 may further be configured to execute the stored instructions to: identify strength of each of a plurality of signals related to a plurality of door-locks, respectively, in response to the door-lock 300 that interlocks with the electronic device including the plurality of door-locks; identify a door-lock 300 regarding a signal having greatest strength from among the plurality of signals related to the plurality of door-locks, respectively; acquire information on an electronic key related to the door-lock 300 identified as having the greatest signal strength; and display the electronic key related to the door-lock 300 identified as having the greatest signal strength through the UI.

In various embodiments, the processor 120 may further be configured to execute the stored instruction to: based on the door-lock 300 that interlocks with the electronic device not existing, acquire information on a location of the electronic device 101 based on a GPS sensor or a network; identify information on an electronic key related to the location of the electronic device 101, based on the acquired information; and display the electronic key related to the location of the electronic device 101 through the UI.

In various embodiments, the processor 120 may further be configured to execute the stored instructions to: identify wherein the information on the electronic key related to the location of the electronic device 101 is obtainable, based on the acquired information; in response to the information on the electronic key related to the location not being obtainable, acquire information on a usage pattern of the plurality of electronic keys; based on the acquired information on the usage pattern, identify information on an electronic key related to the usage pattern from among the plurality of electronic keys; and display the electronic key related to the usage pattern through the UI, based on the identifying.

Figure 5:
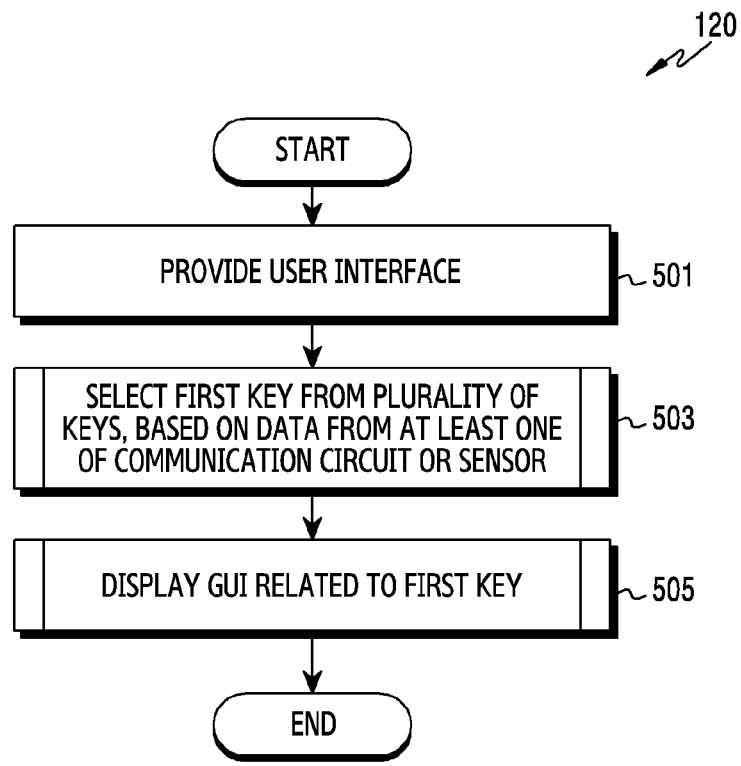
FIG. 5 is a view illustrating an example of an operation of an electronic device for providing information on at least one key according to various embodiments.

FIG. 5 is a view illustrating an example of an operation of an electronic device for providing information on at least one key according to various embodiments.

Referring to FIG. 5, in operation 501, the electronic device 101 (for example, the processor 120) may provide a user interface (UI). In various embodiments, the electronic device 101 may provide a user interface for providing a key service. The key service may include a function of providing an electronic key for unlocking the door-lock 300 through the electronic device 101. In some embodiments, to provide the key service, the electronic device 101 may store information on the door-lock 300 in the electronic device 101. In some other embodiments, the electronic device 101 may store information on a plurality of door-locks. For example, the electronic device 101 may store information on a plurality of keys (electronic keys) used to unlock the plurality of door-locks, respectively. The electronic device 101 may store the information on the door-lock 300 based on a user input. In some other embodiments, the electronic device 101 may store the information on the door-lock 300 based on the information on the door-lock 300 being received from the server 108. In some other embodiments, to provide the key service, the electronic device 101 may provide at least a portion of the information on the door-lock 300 to the server 108, based on connection with the server 108. By providing the information, the electronic device 101 may register the door-lock 300 at the server 108. Based on the registration, the electronic device 101 may provide the key service.

In various embodiments, the electronic device 101 may trigger the key service through at least one input received through the user interface. For example, the electronic device 101 may detect an input for starting the key service. Based on the detection, the electronic device 101 may display the user interface for providing the key service. The input for starting the key service may be described with reference to FIG. 6.

Figure 6:
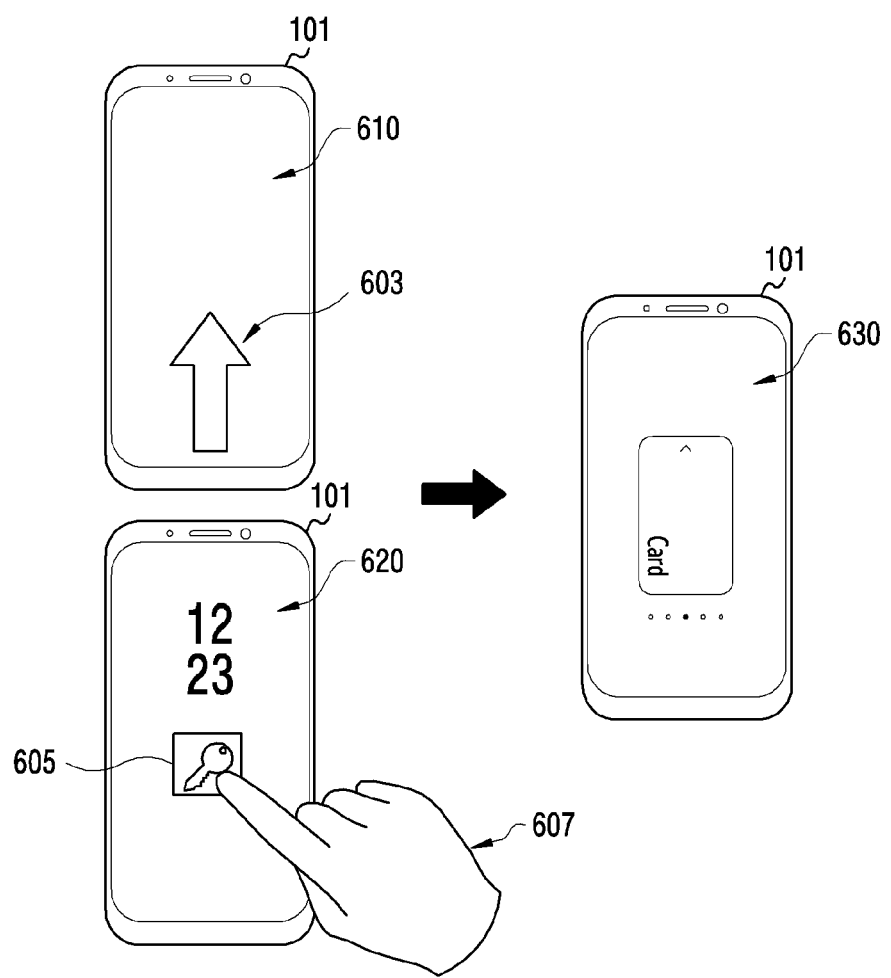
FIG. 6 is a view illustrating an example of a user interface (UI) related to execution of an application according to various embodiments.

Referring to FIG. 6, the electronic device 101 may receive a user input 603 for triggering the key service on a screen 610 in an off-state. The user input 603 may include a touch input of dragging from a lower end of the electronic device

101 to an upper end. Based on the user input 603 being detected, the electronic device 101 may provide a screen 630 related to the key service.

While displaying an always on display (AOD) screen 620, the electronic device 101 may detect a user input 607 on a graphic user interface (GUI) object 605 (for example, an icon) related to the key service. The AOD screen 620 may refer to a screen of the electronic device 101 when a display driver integrated circuit (IC) (DDI) for controlling a display (or a touchscreen display) of the electronic device 101 is enabled and the processor 120 is disabled. The electronic device 101 may provide the key service based on the user input 607 being detected on the AOD screen 620. The electronic device 101 may provide the screen 630 related to the key service, based on the user input 607 being detected on the AOD screen 620.

In various embodiments, the input 603 or the input on the icon 605 may include an input of clicking a volume button, an input of double-tapping a screen, or an input of pressing a power button, although those are not illustrated, and the input is not limited to the above-described examples.

In operation 503, the electronic device 101 may select a first key from the plurality of keys, based on data from at least one of a communication circuit (for example, a wireless communication circuit) or a sensor (for example, a location detection sensor). The data from at least one of the communication circuit or the sensor may include information on a certain key of the plurality of keys. Information on the plurality of keys (or a list indicting the plurality of keys) may be pre-stored in the electronic device 101.

In various embodiments, the data from at least one of the communication circuit or the sensor (for example, the location detection sensor) may include a variety of information for identifying a key for the door-lock 300. For example, the data may include information (or an identification (ID)) for identifying each of the plurality of keys, a name of each of the plurality of keys to be displayed on the electronic device 101, information (or an identifier) for identifying the door-lock 300, a protocol type (for example, BT, BLE, NFC, or MST) for each of the plurality of keys, information indicating a place (for example, a house, an office, a car, or a hotel) of the door-lock 300, information on at least one of a latitude value of the location of the door-lock 300, a longitude value of the location of the door-lock 300, a recent time at which the plurality of keys are updated or a recent time at which the plurality of keys are issued. In various embodiments, the electronic device 101 may select the first key from the plurality of keys based on a signal received through the communication circuit. In some embodiments, the electronic device 101 may receive a signal (or data) from the door-lock 300 through the communication circuit. The signal may include a signal indicating that the door-lock 300 is connected with the electronic device 101 through BT, BLE, or a wireless network. The signal may include a signal that is transmitted to the electronic device 101 from the door-lock 300 through the communication circuit, based on BT, BLE, or the wireless network. The electronic device 101 may identify (or select) the first key related to the door-lock 300 from among the plurality of keys, based on the signal being received.

In various embodiments, the electronic device 101 mays select the first key from the plurality of keys based on a signal received through the sensor (for example, the location detection sensor). In some embodiments, the electronic device 101 may receive a signal indicating the location of the electronic device 101 through the sensor. The electronic device 101 may identify the location of the electronic device 101, based on the received signal being identified. In response to the location being identified, the electronic device 101 may identify the door-lock 300 related to the identified location. According to embodiments, when there are a plurality of door-locks 300 related to the identified location, the electronic device 101 may identify a door-lock (for example, a first door-lock) that is closest to the electronic device 101 from the plurality of door-locks (for example, the first door-lock and the second door-lock). Based on the door-lock 300 being identified, the electronic device 101 may identify (or select) the first key corresponding to the door-lock 300. In various embodiments, the sensor (for example, the location detection sensor) may include various sensors for detecting (or identifying or determining) the location of the electronic device 101. For example, the sensor may include at least one of a global positioning system (GPS) sensor, a WiFi sensor, or a biometric sensor. According to embodiments, the sensor may be referred to as various terms, and is not limited to the above-described example in the disclosure.

In various embodiments, the electronic device 101 may select the first key based on information acquired by using the communication circuit. When information related to the first key is not acquired by using the communication circuit, the electronic device 101 may select the first key based on information acquired by using the sensor. Selecting the first key based on the data of the communication circuit or the sensor may be described with reference to FIG. 7.

Figure 7:
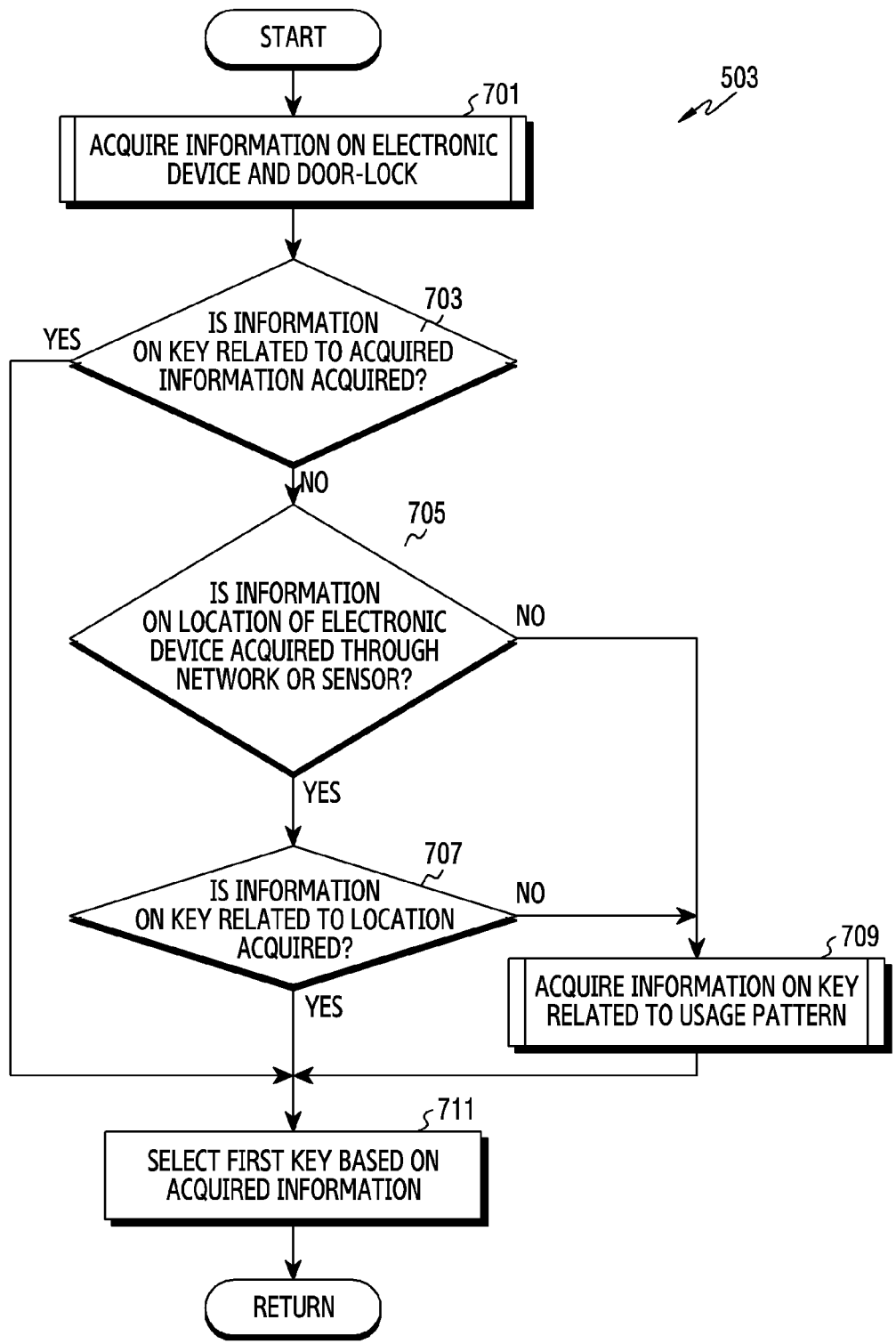
FIG. 7 is a view illustrating an example of an operation of an electronic device for selecting a key based on a state of the electronic device according to various embodiments.

Referring to FIG. 7, in operation 701, the electronic device 101 may acquire information on the door-lock 300 (or another electronic device). The electronic device 101 may interlock with the door-lock 300 through the communication circuit. The electronic device 101 may transmit a signal (or data) to the door-lock 300 or may receive a signal from the door-lock 300 through the communication circuit. The electronic device 101 may acquire the information on the door-lock 300 through the communication circuit. The information on the door-lock 300 may include, for example, information on strength of a connection between the door-lock 300 and the electronic device 101, information on strength of a signal related to the door-lock 300 and the electronic device 101, information on strength of a signal received from the door-lock 300, information on strength of a signal transmitted to the door-lock 300, information on a type of the door-lock 300, or information on a key related to the door-lock 300. Acquiring the information on the door-lock 300 will be described below with reference to FIG. 8.

Figure 8:
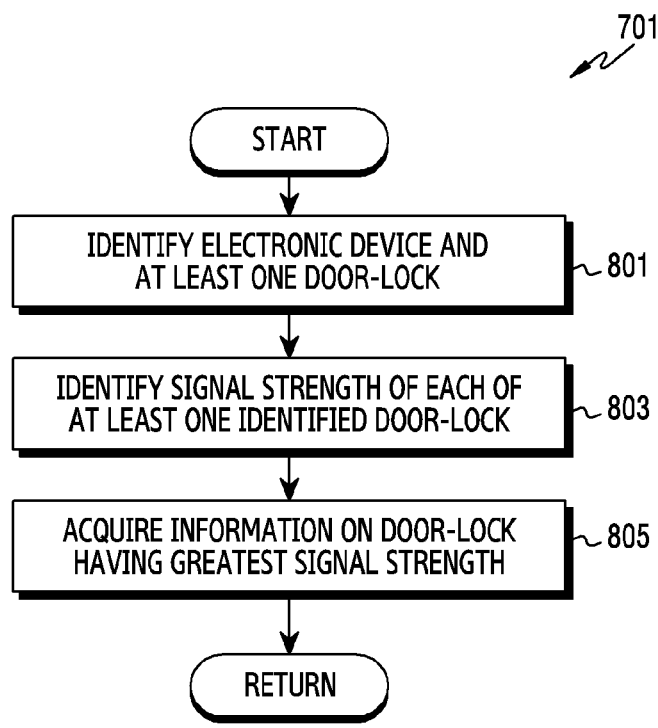
FIG. 8 is a view illustrating an example of an operation of an electronic device for acquiring information on a key based on a connection according to various embodiments.

Referring to FIG. 8, in operation 801, the electronic device 101 (for example, the processor 120) may identify at least one door-lock (for example, the door-lock 300). According to embodiments, the electronic device 101 may transmit or receive a signal (or data) to or from at least one external device through a communication module (for example, the communication module 190). The electronic device 101 may identify at least one door-lock from among the at least one external device based on the signal (or data). The at least one door-lock may correspond to some (for example, a first door-lock and a second door-lock) of the plurality of door-locks (for example, the first door-lock, the second door-lock, and a third door-lock) interlocking with the electronic device 101. Information on the plurality of door-locks may be already registered (or stored) in the electronic device 101 (or the memory 130). The information on the plurality of door-locks may be stored in the electronic device 101, such that the electronic device 101 can interlock with the plurality of door-locks.

In various embodiments, the electronic device 101 may acquire information on the electronic device and at least one external device. When an electronic device other than the door-lock is included in the electronic device 101 and the at least one external device, the electronic device 101 may identify at least one door-lock from among the at least one external device.

In operation 803, the electronic device 101 may identify signal strength on each of the at least one identified door-lock. The electronic device 101 may acquire information on RSSI signal strength based on various communication methods (for example, BT or BLE). The electronic device 101 may store information on the RSSI signal strength on each of the at least one door-lock. In an embodiment, the electronic device 101 may arrange the at least one door-lock in sequence of RSSI signal strength, based on the information on the RSSI signal strength.

In operation 805, the electronic device 101 may acquire information on a door-lock having the greatest signal strength. The electronic device 101 may identify a door-lock having the greatest RSSI signal strength. The electronic device 101 may determine the door-lock having the greatest RSSI signal strength as being positioned at a location closest to the electronic device 101. According to various embodiments, the electronic device 101 may acquire information on the door-lock having the greatest signal strength based on the arranged information on the RSSI signal strength.

In various embodiments, the electronic device 101 may determine information related to signal strength of the electronic device 101 and the at least one door-lock as information of a first priority related to the key service. The information of the first priority may include information on at least one key that is provided by the electronic device 101 as a first priority to provide the key service.

The electronic device 101 may acquire the information on the at least one door-lock based on the information arranged according to the RSSI signal strength. For example, the electronic device 101 may acquire information on the first door-lock having the greatest RSSI signal strength and/or information on the second door-lock having the second RSSI signal strength. The electronic device 101 may acquire the information on the first door-lock and/or the information on the second door-lock in sequence or regardless of the sequence.

In operation 703, the electronic device 101 may identify whether information on a key related to the acquired information is acquired (or can be acquired). The electronic device 101 may identify the door-lock 300 based on (or by using) the signal (or data) received by the electronic device 101. The electronic device 101 may acquire information on a key of the door-lock 300, based on the signal (or data) received by the electronic device 101. The electronic device 101 may identify whether the information on the key of the door-lock 300 is acquired. For example, when the door-lock 300 identified by the electronic device 101 is the first door-lock, the electronic device 101 may identify whether information on the first key related to the first door-lock is acquired. In another example, the electronic device 101 may identify whether information indicating the first key on the first door-lock having the greatest RSSI signal strength, and/or information indicating a second key on the second door-lock having the second RSSI signal strength is acquired.

In various embodiments, when the information on the first key is stored in the electronic device 101 or the server 108, the electronic device 101 may acquire the information on the first key. The electronic device 101 may identify whether the information on the key related to the door-lock 300 is included in the electronic device 101 or the server 108, based on the information on the door-lock 300 being acquired. When the information on the key related to the door-lock 300 is included in the electronic device 101 or the server 108, the electronic device 101 may acquire the information on the key by identifying the information on the key.

The electronic device 101 may perform operation 711 in response to the electronic device 101 acquiring the information on the key related to the door-lock 300. The electronic device 101 may acquire the information on the key related to the door-lock 300, based on a signal related to the electronic device 101 or the door-lock 300. The electronic device 101 may perform operation 705 in response to the electronic device 101 failing to acquire the information on the key related to the door-lock 300.

In operation 705, the electronic device 101 may identify whether information on a location of the electronic device 101 is acquired (or can be acquired), through a network or a sensor. The electronic device 101 may acquire the information on the location of the electronic device 101 through the network or the sensor. The information on the location may include information on a place where the electronic device 101 is currently positioned. For example, the electronic device 101 may acquire the information on the location, based on a location of a WiFi router, a location of the electronic device 101 measured by a global positioning system (GPS), strength of a signal received through BT (or BLE), or a location of a base station of the network. The electronic device 101 may identify whether the information on the location of the electronic device 101 is acquired. The electronic device 101 may identify whether the information on the location of the electronic device 101 is acquired, based on a signal received by the electronic device 101, in response to the electronic device 101 failing to acquire the information on the door-lock 300 or the key related to the door-lock 300.

The electronic device 101 may perform operation 707 in response to the information on the location of the electronic device 101 being acquired. The electronic device 101 may perform operation 709, in response to the information on the key related to the door-lock 300 not being acquired based on the signal received by the electronic device 101.

In operation 707, the electronic device 101 may identify whether information on a key related to the location is acquired (or can be acquired). The electronic device 101 may identify the location of the electronic device 101, based on the information on the location of the electronic device 101 being acquired. The electronic device 101 may identify information on the door-lock 300 related to the location, based on the location of the electronic device 101 being identified. For example, in response to the location of the electronic device 101 being a designated place (for example, a house, an office), the electronic device 101 may identify information on the first door-lock mounted on a front door of the house or information on the second door-lock mounted on a door of the office. The electronic device 101 may acquire information on the key related to the door-lock 300, by identifying the information on the door-lock 300. For example, the electronic device 101 may acquire information on the first key corresponding to the first door-lock, based on the information on the first door-lock mounted on the front door of the house being identified. In another example, the electronic device 101 may acquire information on the second key corresponding to the second door-lock, based on the information on the second door-lock mounted on the door of the office being identified.

In various embodiments, the electronic device 101 may identify whether the information on the key of the door-lock 300 related to the location of the electronic device 101 is acquired. The electronic device 101 may identify whether the information on the key related to the door-lock 300 is acquired, based on the location of the electronic device 101 or the door-lock 300 related to the location of the electronic device 101 being identified.

In operation 709, the electronic device 101 may acquire information on a key related to a usage pattern. The usage pattern may include information on a shape, a state, or a pattern in which the plurality of keys provided through the key service are used. For example, the usage pattern may include information on time at which the plurality of keys are used, or information on a sequence in which the plurality of keys are used. The electronic device 101 may acquire information on the usage pattern, based on information on use of at least some of the plurality of keys related to the key service being accumulated. In various embodiments, the electronic device 101 may acquire the information on the key related to the usage pattern, in response to the electronic device 101 failing to acquire the information on the location of the electronic device 101. In some other embodiments, the electronic device 101 may acquire the information on the key related to the usage pattern, in response to the electronic device 101 failing to acquire the information on the key related to the location of the electronic device 101. The usage pattern will be described below through FIG. 15 or 16.

In various embodiments, when the information on the key related to the usage pattern from among the plurality of keys is not acquired, the electronic device 101 may not provide the information on the key although this is not illustrated. For example, when the information on the key related to the usage pattern is not acquired, the electronic device 101 may finish the operation of the electronic device 101 for selecting and providing information on one key of the plurality of keys. According to various embodiments, when the information on the key related to the usage pattern is not acquired, the electronic device 101 may provide information on a key according to a designated criterion irrespective of a state of the electronic device 101. The designated criterion may include a sequence related to the respective names of the plurality of keys or an issuance sequence of the plurality of keys.

In some other embodiments, the electronic device 101 may acquire the information on the key related to the usage pattern, based on information on the usage pattern that is stored in the memory 130. The electronic device 101 may identify information on the usage pattern that is generated according to a usage history of at least some of the plurality of keys. By identifying the information on the usage pattern, the electronic device 101 may acquire the information on the key related to the usage pattern. In some other embodiments, the electronic device 101 may acquire the information on the key related to the usage pattern, by using the server 108 or based on the information stored in the memory 130. Acquiring the information on the key related to the usage pattern will be described below through FIG. 9.

Figure 9:
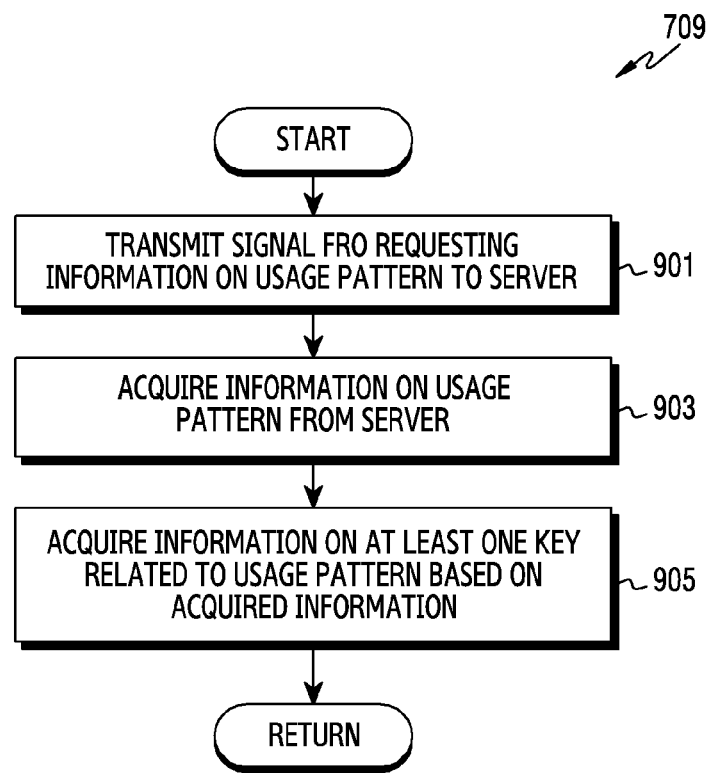
FIG. 9 is a view illustrating an example of an operation of an electronic device for acquiring information on a key based on a usage pattern according to various embodiments.

Referring to FIG. 9, in operation 901, the electronic device 101 may transmit a signal for requesting the information on the usage pattern to the server 108. In some embodiments, when the information on the location of the electronic device 101 is not acquired, the electronic device 101 may transmit the signal for requesting the information on the usage pattern to the server 108. In some other embodiments, when the information on the key related to the location of the electronic device 101 is not acquired, the electronic device 101 may transmit the signal for requesting the information on the usage pattern to the server 108.

In operation 903, the electronic device 101 may acquire the information on the usage pattern from the server 108. The electronic device 101 may acquire (or receive) the information on the usage pattern from the server 108, in response to the signal for requesting the information on the usage pattern being transmitted to the server 108. For example, the electronic device 101 may acquire information on a usage pattern related to a day or information on a usage pattern related to a place.

In various embodiments, operation 901 and/or operation 903 may be omitted although this is not illustrated. In this case, instead of operation 901 and/or operation 903, an operation related thereto may be performed by the electronic device 101. For example, when the information on the location of the electronic device 101 is not acquired, the electronic device 101 may identify information on the usage pattern. The information on the usage pattern may be stored in the memory 130. The electronic device 101 may acquire the information on the usage pattern, based on the stored information on the usage pattern being identified.

In operation 905, the electronic device 101 may acquire information on at least one key related to the usage pattern, based on the acquired information on the usage pattern. The electronic device 101 may acquire information on a key to be provided through the key service, by identifying the information on the usage pattern. For example, the electronic device 101 may acquire information on a key related to a current location of the electronic device 101, based on the information on the usage pattern related to the place being acquired.

At least some operations of FIG. 9 may be performed through the server 108 although this is not illustrated. In various embodiments, the server 108 may provide (or transmit) the information on the key related to the usage pattern to the electronic device 101. In some embodiments, the server 108 may identify a state of the electronic device 101, in response to the signal for requesting the information on the usage pattern being received. In an embodiment, the server 108 may identify the state of the electronic device 101 based on a connection with the electronic device 101. The state of the electronic device 101 may include, for example, a location related to the electronic device 101 (for example, a place where the electronic device 101 is positioned), or a time related to the electronic device 101 (for example, time information of the electronic device 101 on a system). In some other embodiments, the server 108 may provide information on a key corresponding to the identified state of the electronic device 101 to the electronic device 101, based on the information on the usage pattern. The server 108 may provide (or transmit) information on a key corresponding to the current location of the electronic device 101 to the electronic device 101, based on the information on the usage pattern. In this case, at least some of operations 903 to 905 may be omitted.

In operation 711, the electronic device 101 may select the first key based on the acquired information on the key. The electronic device 101 may select the first key, based on the acquired information on the key being identified or the acquired information on the key being provided. The acquired information on the key may include the information on the key related to the door-lock 300, the information on the key related to the location of the electronic device 101, or the information on the key related to the usage pattern. In some embodiments, the electronic device 101 may select the first key by identifying the acquired information on the key. In some other embodiments, the electronic device 101 may cause the user to select the first key by providing the acquired information on the key. The electronic device 101 may detect a user input on the first key, and may select (or determine) the first key based on the detected input. In some other embodiments, the electronic device 101 may provide the acquired information on the key, in response to there being a plurality of keys related to the acquired information on the key. The electronic device 101 may cause the user to select the first key from the plurality of keys. According to embodiments, the first key may be a term indicating some (for example, a house key and a car key) of the plurality of keys (for example, a house key, a car key, and an office key), and is not limited to a term indicating one key.

In various embodiments, the operation of acquiring the information on the key related to the door-lock 300, the operation of acquiring the information on the key related to the location of the electronic device 101, or the operation of acquiring the information on the key related to the usage pattern of the electronic device 101 is not limited to the above-described example.

In various embodiments, at least some of operations 701 to 711 of FIG. 7 may be performed through the server 108. For example, the server 108 may acquire information on the door-lock 300, based on a signal being transmitted to the electronic device 101 and the door-lock 300 or a signal being received from the door-lock 300. In this case, the server 108 may identify information on a key related to the door-lock 300 and provide the information to the electronic device 101. In another example, the server 108 may identify a location of the electronic device 101, based on a signal related to the electronic device 101 being transmitted and/or received. The server 108 may acquire information on the door-lock 300 related to the location of the electronic device 101, based on the location of the electronic device 101 being identified. The server 108 may identify information on a key of the door-lock 300 related to the location of the electronic device 101 by using the acquired information on the door-lock 300. The server 108 may provide the identified information on the key of the door-lock 300 to the electronic device 101. In various embodiments, the electronic device 101 may display the information on the key of the door-lock 300 that is provided from the server 108.

In various embodiments, the electronic device 101 may provide the information on the key according to the state of the electronic device 101, such that the user can be induced to use a convenient or effective key service without an additional input for selecting the key.

In various embodiments, the electronic device 101 may provide information on a plurality of keys, based on data from at least one of the communication circuit or the sensor. The information on the plurality of keys may include information indicating at least some of the plurality of keys for providing the key service. The electronic device 101 may arrange at least some of the plurality of keys according to a designated criterion, thereby providing the information on the plurality of keys. Providing the information on the plurality of keys will be described below through FIG. 10.

Figure 10:
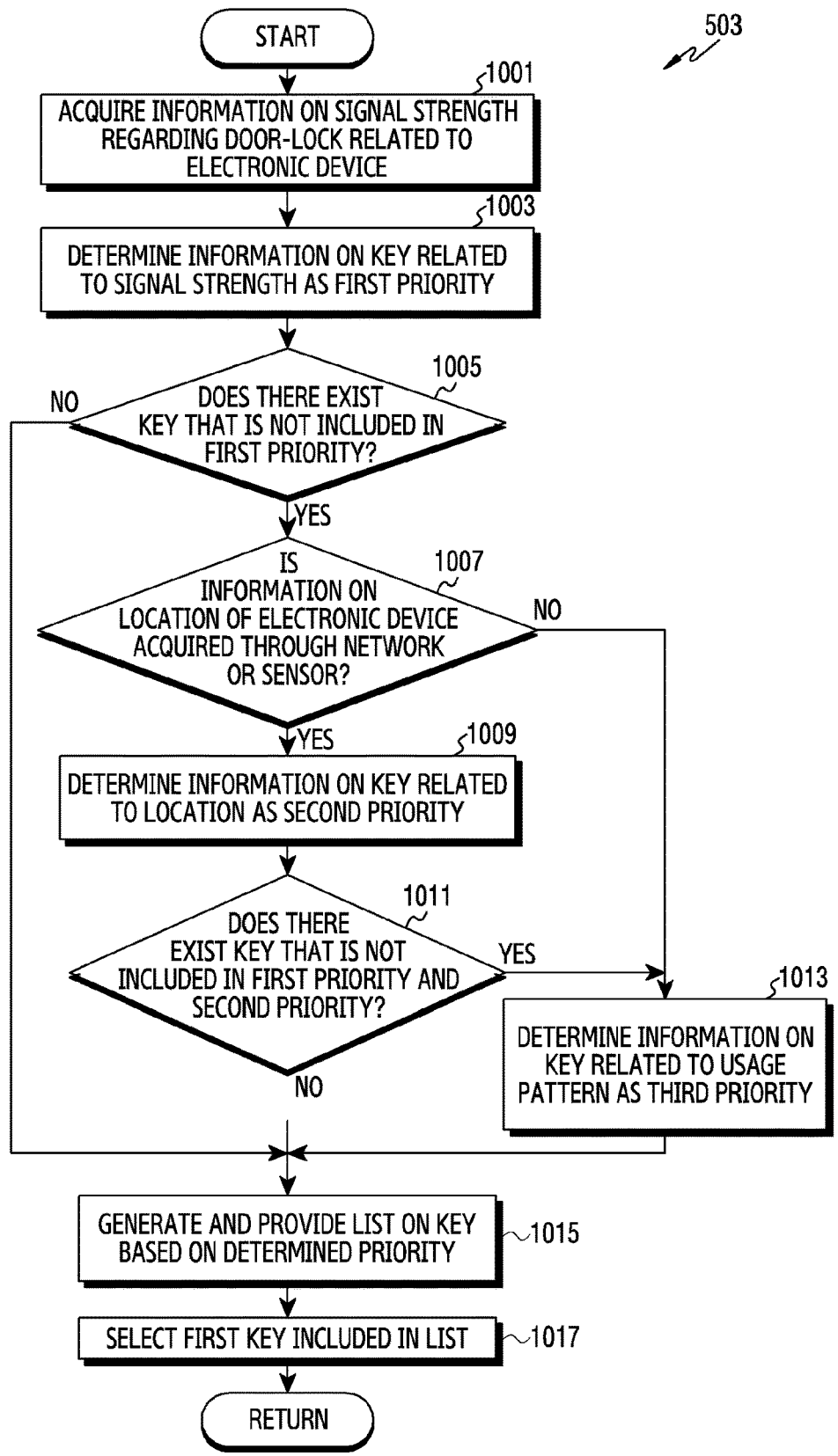
FIG. 10 is a view illustrating an example of an operation of an electronic device for providing information on a list related to a key according to various embodiments.

Referring to FIG. 10, in operation 1001, the electronic device 101 (for example, the processor 120) may acquire information on signal strength related to the door-lock 300. The electronic device 101 may transmit or receive a signal (data) to or from the door-lock 300, and may acquire the information on the signal strength (or strength of a signal) related to the door-lock 300. The information on the signal strength may include, for example, information on RSSI signal strength. The electronic device 101 may acquire the information on the RSSI signal strength, based on various communication methods (for example, BT or BLE).

In operation 1003, the electronic device 101 may determine information on a key related to the signal strength as a first priority (or information of the first priority). In various embodiments, when there are a plurality of keys related to the signal strength since there are a plurality of door-locks 300 related to a signal received at the electronic device 101 (or a signal transmitted from the electronic device 101), the electronic device 101 may generate information on the keys from highest to lowest signal strength. The electronic device 101 may determine the generated information on the keys as the first priority to select the first key. According to various embodiments, when there is no door-lock 300 related to the signal received at the electronic device 101 (or the signal transmitted from the electronic device 101), the electronic device 101 may determine the first priority as being in an empty state. For example, the electronic device 101 may not include information on any key of the plurality of keys within the first priority.

In operation 1005, the electronic device 101 may identify whether there exists a key that is not included within the first priority. The electronic device 101 may identify a key that is not included within the first priority from among the plurality of keys related to the key service. In various embodiments, the electronic device 101 may perform operation 1007 in response to the key that is not included within the first priority (or a key different (or distinct) from the key included in the first priority) being included in the plurality of keys. The electronic device 101 may perform operation 1015 in response to the key that is not included within the first priority not being included in the plurality of keys.

In operation 1007, the electronic device 101 may acquire information on a location of the electronic device 101 through the network or the sensor. Operation 1007 may correspond to operation 705. In various embodiments, in response to the information on the location being acquired, the electronic device 101 may perform operation 1009. In response to the information on the location not being acquired (failing to acquire the information), the electronic device 101 may perform operation 1009.

In operation 1009, the electronic device 101 may determine information on a key related to the location as a second priority (or information of the second priority). The electronic device may identify the key related to the location from among the plurality of keys, based on the acquired information on the location. The electronic device 101 may determine the information on the identified key related to the location as the second priority. According to various embodiments, when the key related to the location is not included in the plurality of keys, the electronic device 101 may determine the second priority as being in an empty state. For example, the electronic device 101 may not include, within the second priority, information on any key of some of the plurality of keys that are not included within the first priority.

In operation 1011, the electronic device 101 may identify whether there exists a key that is not included in the first priority and the second priority. The electronic device 101 may identify whether there exists a key that is not included in the first priority and the second priority from among the plurality of keys (or a key different (or distinct) from the keys included in the first priority and the second priority). The electronic device 101 may perform operation 1013 in response to there existing the key that is not included in the first priority and the second priority. The electronic device 101 may perform operation 1015 in response to there not existing the key that is not included in the first priority and the second priority.

In operation 1013, the electronic device 101 may determine information on a key related to a usage pattern as a third priority. The electronic device 101 may identify a usage pattern related to the key that is not included in the first priority and the second priority, in response to there existing the key that is not included in the first priority or the second priority from among the plurality of keys.

In some embodiments, the electronic device 101 may identify a usage pattern on the plurality of keys. The electronic device 101 may determine at least some of the keys that are not included in the first priority and the second priority as the third priority to correspond to the identified usage pattern. For example, the electronic device 101 may identify information on the plurality of keys corresponding to a house key, a car key, and an office key, respectively. The house key may be a key that is included in the first priority or the second priority, and the car key and the office key may be keys that are not included in the first priority or the second priority. The electronic device 101 may identify a usage pattern related to the house key, the car key, and the office key. The identified usage pattern may be a usage pattern related to a using sequence indicating that the car key, the house key, and the office key are used in sequence. The electronic device 101 may determine information on the keys that are arranged in sequence of the car key and the office key as the third priority, based on the identified usage pattern.

In some other embodiments, the electronic device 101 may identify the usage pattern of the key that is not included in the first priority and the second priority. Based on the usage pattern on the key that is not included in the first priority and the second priority being identified, the electronic device 101 may determine at least some of the keys that are not included in the first priority and the second priority as the third priority to correspond to the usage pattern. For example, the electronic device 101 may identify information on the keys that are not included in the first priority and the second priority corresponding to the house key, the car key, and the office key. The electronic device 101 may identify the usage pattern related to the house key, the car key, and the office key. The identified usage pattern may be a usage pattern related to a using sequence indicating that the house key and the office key are used in sequence. The electronic device 101 may determine information on the keys arranged in sequence of the house key and the office key as the third priority, based on the identified usage pattern.

In various embodiments, the electronic device 101 may determine information that is not determined as the third priority, as a fourth priority, although this is not illustrated. The electronic device 101 may identify information on a key that is not included in the first priority, the second priority, and the third priority from among the plurality of keys. The electronic device 101 may determine the key that is not included in the first priority, the second priority, and the third priority as the fourth priority.

In operation 1015, the electronic device 101 may generate and provide list information based on the determined priority. The electronic device 101 may generate the list information with the information on the keys that are determined as the first priority, the second priority, or the third priority, based on their respective priorities. The electronic device 101 may generate list information for indicating the information on the keys according to the determined priority. The list information may include the determined priority and information on the key corresponding to the determined priority.

In various embodiments, when two or more keys are included in the same priority, the electronic device 101 may arrange the two or more keys within the same priority. The electronic device 101 may arrange the two or more keys within the same priority based on a designated arrangement method. The designated arrangement method may include, for example, at least one of a method of arranging according to a sequence of time of using, a method of arranging according to a sequence of time of issuing a key, a method of arranging according to a descending order of names of keys, or a method of arranging according to an ascending order of names of keys. The electronic device 101 may generate the list information by arranging the two or more keys in the same priority, based on the designated arrangement method. According to various embodiments, the two or more keys within the same priority may be arranged at the step of determining their priorities. For example, the electronic device 101 may identify whether two or more keys are included within the information of the first priority in response to the information of the first priority being determined. The electronic device 101 may arrange the two or more keys based on the designated arrangement method, in response to the two or more keys being included in the information of the first priority.

The electronic device 101 may provide the generated list information. The electronic device 101 may provide the generated list information by displaying the generated list information on a display. Providing the list information may be described with reference to FIG. 11.

Figure 11:
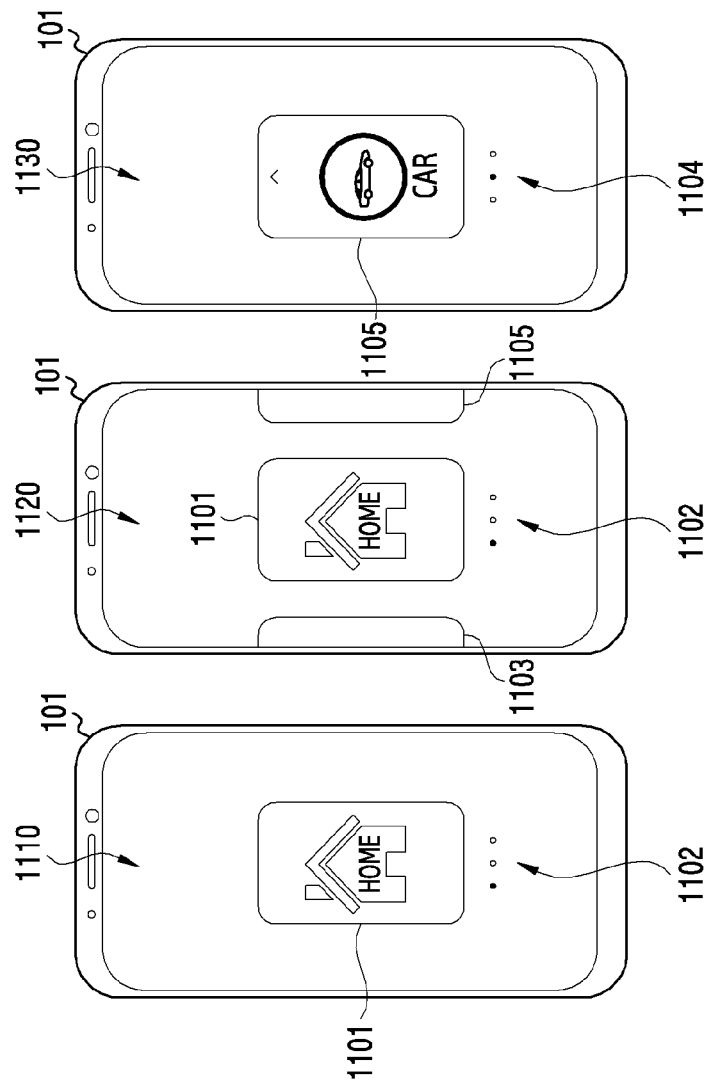
FIG. 11 is a view illustrating an example of a UI for providing information related to a key according to various embodiments.

FIG. 11 is a view illustrating various screens (or user interfaces) which may be displayed on the electronic device 101 to provide a key service. Referring to FIG. 11, the electronic device 101 may display information indicating a key 1101 of the first priority on a screen 1110. The screen 1110 may be a user interface (UI) for providing the key service. An icon 1102 may be displayed on a lower end of the key 1101 to indicate the number (for example, 3) of keys included in a list. The icon 1102 may be changed according to the number of keys included in the list. For example, in response to four keys being included in the list, the electronic device 101 may change the icon 1102 including three small circles to an icon including four small circles, although this is not illustrated. According to various embodiments, the electronic device 101 may match the respective circles included in the icon 1102 with keys and may display the circles. For example, in response to the key 1101 of the first priority being displayed, the first circle from among the three circles included in the icon 1102 (or a circle distinct from the other circles) may be highlighted (or distinguished from the other circles), and may be displayed. There may be various methods for displaying the icon 1102, and the methods are not limited to the above-described example.

The electronic device 101 may display, on a screen 1120, at least a portion of information indicating a key 1105 of the second priority and at least a portion of information indicating a key 1103 of the third priority, along with the information indicating the key 1101 of the first priority. In various embodiments, the electronic device 101 may display the key 1105 of the second priority, based on an input for changing the displayed key being detected (or received). For example, the input for changing the displayed key may include an input of swiping from the key 1105 toward the key 1101. In another example, the input may include tapping, long-pressing, or double-tapping at least a portion indicating the key 1105 displayed. The input for changing the displayed key is not limited to the above-described example.

In various embodiments, the electronic device 101 may display the key 1105 of the second priority through a screen 1130 in response to the input for displaying the key 1105 of the second priority being detected. As the key 1105 of the second priority is displayed, the icon 1102 indicating the number of keys may be changed and displayed. For example, in response to the key 1105 of the second priority being displayed, the electronic device 101 may change the icon 1102 to an icon 1104 highlighting the second circle from among the three circles (or distinguishing from the other circles), and may display the changed icon.

In operation 1017, the electronic device 101 may select the first key included in the list information. The electronic device 101 may select the first key within the list information including the information on the keys. The electronic device 101 may detect an input for selecting the first key included in the provided list information, based on the list information being provided. Based on an input on the list information being detected, the electronic device 101 may select the first key corresponding to the first input. The input for selecting the key may include an input of selecting one of the plurality of keys included in the displayed list information. The input may include, for example, an input of tapping, double-tapping, or long-pressing the first key. The input may include various inputs for selecting the first key and is not limited to the above-described example.

In various embodiments, at least some of the operations related to FIG. 10 may be performed through the server 108 although this is not illustrated. For example, the server 108 may acquire information on signal strength, based on a connection with the electronic device 101. The server 108 may identify information on a key related to the signal strength, by using a database (for example, meta data 369) of the server 108 including information related to keys, based on the acquired information on the signal strength. The server 108 may provide the identified information to the electronic device 101. In another example, information on a usage pattern may be acquired by using the database of the server 108 including the information related to the keys. The server 108 may identify information on a key related to the usage pattern, based on the acquired information on the usage pattern. The server 108 may provide the identified information on the key to the electronic device 101. In various embodiments, the electronic device 101 may provide information on the plurality of keys in sequence of a state of the electronic device 101, such that a convenient or effective key service can be provided.

In operation 505, the electronic device 101 (for example, the processor 120) may display a graphic user interface (GUI) related to the first key. The electronic device 101 may display a GUI (or a UI) for indicating the first key, based on the first key being selected based on the data acquired through the communication circuit or the sensor. Displaying the GUI related to the first key may be described with reference to FIG. 12 or 13.

The electronic device 101 may select and provide the first key from among the plurality of keys, based on an input (or a signal or a trigger) for using the key service being detected (or identified), although this is not illustrated.

Figure 12:
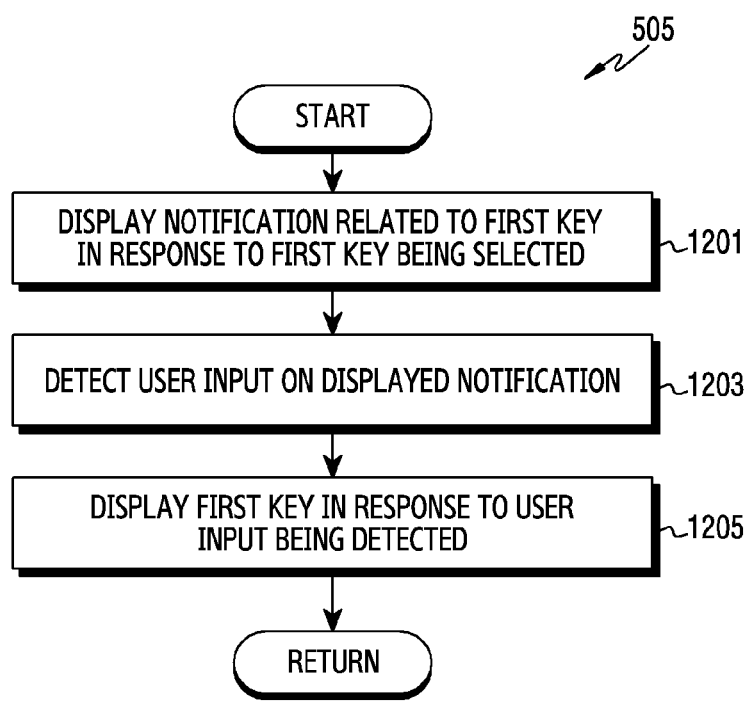
FIG. 12 is a view illustrating an operation of an electronic device for providing a notification related to a key according to various embodiments.

Referring to FIG. 12, in operation 1201, the electronic device 101 (for example, the processor 120) may display a notification related to the first key in response to the first key being selected. When the first key is selected, the electronic device 101 may display a notification for indicating selection of the first key. Displaying the notification will be described below with reference to FIG. 13.

Figure 13:
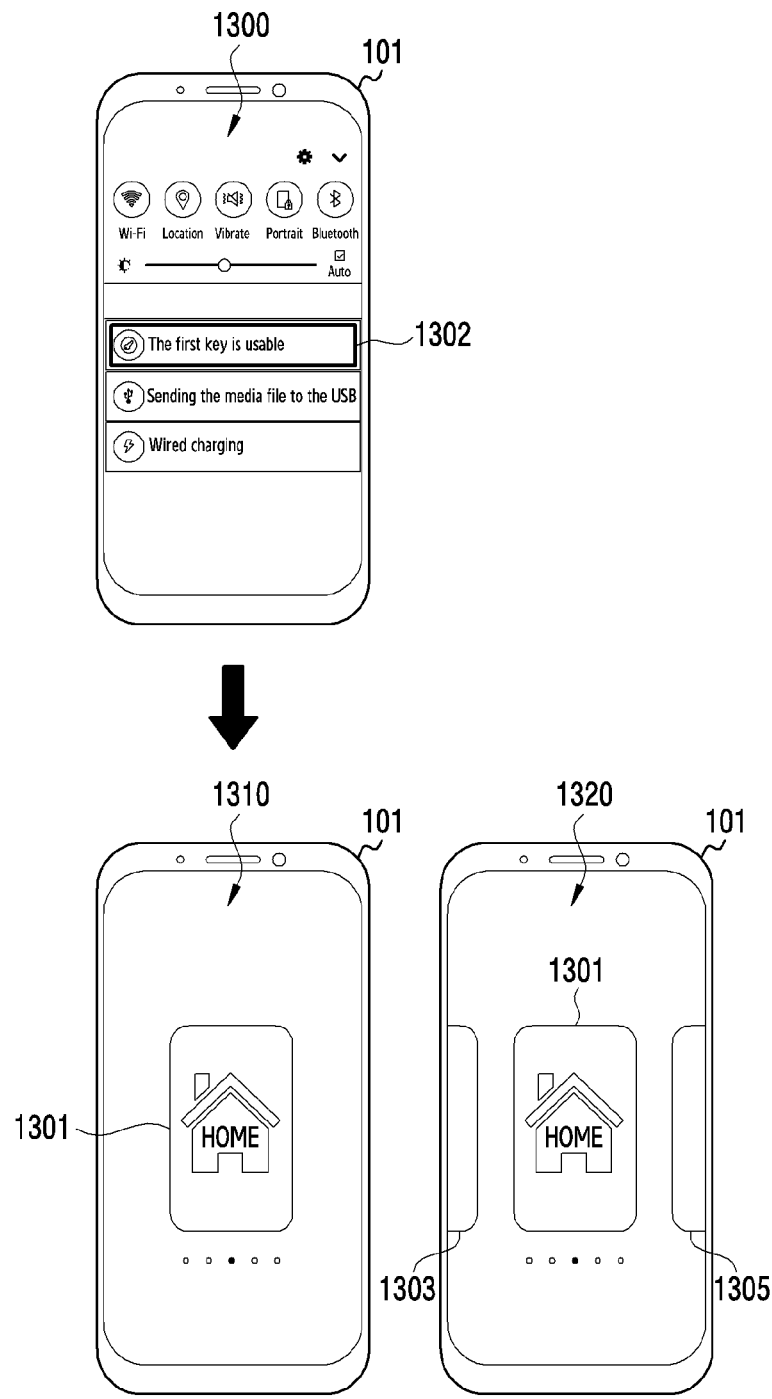
FIG. 13 is a view illustrating an example of a UI for providing a notification related to a key according to various embodiments.

Referring to FIG. 13, the electronic device 101 may display a notification 1302 indicating the first key for providing the key service through a notification window 1300 of the electronic device 101. In some embodiments, the electronic device 101 may display the notification window 1300, based on an input on an upper end bar of the screen of the electronic device 101 (for example, an input of dragging the upper end bar downward) being detected. In some other embodiments, the electronic device 101 may automatically display the notification window 1300 in response to the first key being selected. The electronic device 101 may provide information indicating that the first key is selected, by displaying the notification 1302 in the notification window 1300. According to various embodiments, the notification 1302 may include an image or a text.

In operation 1203, the electronic device 101 may detect a user input on the displayed notification. The electronic device 101 may detect a user input on the notification for indicating that the first key is selected. The user input will be described below through FIG. 13.

Referring to FIG. 13, the electronic device 101 may detect (or receive) an input on the notification 1302 included in the notification window 1300. For example, the electronic device 101 may detect an input of tapping the notification 1302. The electronic device 101 may display a GUI (or UI) related to the first key (for example, a screen 1310 or a screen 1320), based on the input on the notification 1302 being detected.

In operation 1205, the electronic device 101 may display the first key in response to the user input being detected. The electronic device 101 may display the first key on the display of the electronic device 101. Displaying the first key will be described below through FIG. 13.

Referring to FIG. 13, the electronic device 101 may provide (or display) a screen (for example, the screen 1310 or the screen 1320) including a GUI (or the UI) (for example, an image) indicating the first key 1301. The screen 1310 may include the GUI on the first key 1301 selected from the plurality of keys. The screen 1320 may include a GUI regarding the first key 1301 from among the plurality of keys, a portion of the second key 1305, and a portion of the third key 1305.

In various embodiments, the electronic device 101 may provide information on the first key 1301 to open the door-lock 300, concurrently with displaying the GUI related to the first key 1301. The electronic device 101 may provide the information on the first key 1301 to the door-lock 300. According to an embodiment, the electronic device 101 may provide the information on the first key 1301 to the door-lock 300 through the communication module 190. To provide the first key 1301, the electronic device 101 may use various communication methods (for example, BT, BLE), and is not limited to the above described example.

In various embodiments, the electronic device 101 may provide an all-in-one key service providing information on the plurality of keys through a designated GUI. The electronic device 101 may select one key (for example, the first key) corresponding to a state of the electronic device 101 from the plurality of keys, and may provide the selected one key through a designated GUI. According to various embodiments, the electronic device 101 may provide the all-in-one key service without displaying the designated GUI, based on the state of the electronic device 101 being identified. For example, the electronic device 101 may continuously identify a distance between the electronic device 101 and the door-lock 300, and, when the electronic device 101 is positioned within a designated distance, the electronic device 101 may provide information on at least one key. In this case, even when the display of the electronic device 101 is in a disabled state, the electronic device 101 may provide the all-in-one key service by providing information on the key to the door-lock 300 through the communication module 190. The all-in-one key service may refer to a term indicating a key service for providing information on a key corresponding to a state of the electronic device 101 without a user input of selecting the key, in response to an input (or a trigger) indicating provision of the key service being detected. In some embodiments, when providing the all-in-on key service, the electronic device 101 may provide a GUI indicating a provided key. In some other embodiments, the electronic device 101 may provide the key service without displaying the GUI indicating the provided key. The all-in-one service is not limited to the above-described term and may be indicated by various terms.

In various embodiments, the electronic device 101 may provide (or recommend) information on a key according to a state of the electronic device 101, such that the user can be induced to use a convenient or effective key service, without an input for selecting the key. In some embodiments, the electronic device 101 may provide (or recommend) information on a plurality of keys in sequence related to the state of the electronic device 101, such that a convenient or effective key service can be provided to the user.

Figure 14:
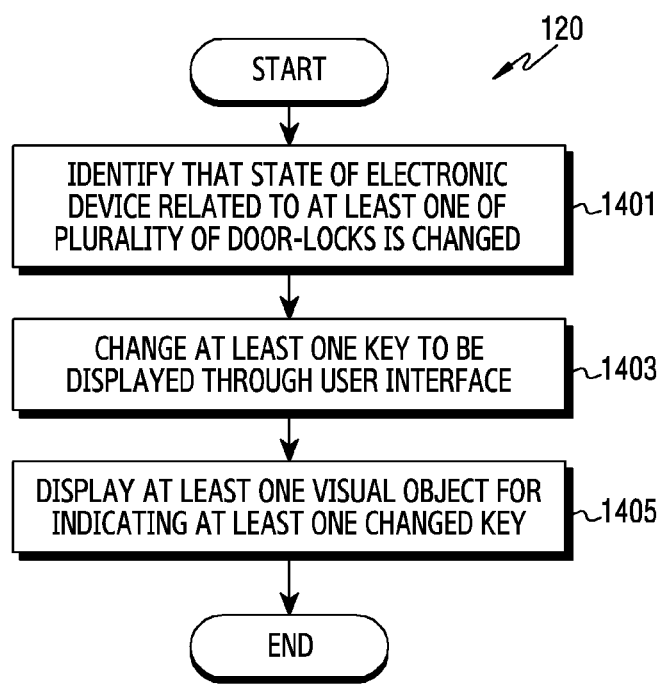
FIG. 14 is a view illustrating another example of an operation of an electronic device for providing information on at least one key according to various embodiments.

FIG. 14 is a view illustrating another example of an operation of an electronic device for providing information on at least one key according to various embodiments.

Referring to FIG. 14, in operation 1401, the electronic device 101 (for example, the processor 120) may identify that a state of the electronic device 101 related to at least one of a plurality of door-locks (or locking devices or locking sensors) is changed. In various embodiments, the electronic device 101 may include information on the plurality of door-locks. The electronic device 101 may interlock with the plurality of door-locks, based on the information on the plurality of door-locks being included. The electronic device 101 may identify a state (or a change of a state) of the electronic device 101, based on interlocking with the plurality of door-locks.

In various embodiments, the electronic device 101 may identify a state of the electronic device 101 related to transmission and/or reception of a signal of at least some of the plurality of door-locks. In some embodiments, the electronic device 101 may identify whether there exists at least one door-lock that transmits and/or receives a signal to and/or from the electronic device 101, from among the plurality of door-locks. In some other embodiments, the electronic device 101 may be connected with one door-lock (for example, the first door-lock) from among the plurality of door-locks. The electronic device 101 may identify a state of the electronic device 101 related to a change of the door-lock 300 related to the transmission and/or reception of a signal. For example, the electronic device 101 may identify a state of the electronic device 101 regarding whether reception (or transmission) of a signal related to the first door-lock is maintained. In another example, the electronic device 101 may identify a state of the electronic device 101 regarding whether reception (or transmission) of a signal is changed to the second door-lock of the plurality of door-locks from the first door-lock.

In various embodiments, the electronic device 101 may identify that a state of the electronic device 101 related to a location is changed. The electronic device 101 may identify whether the state of the electronic device 101 related to the location is changed, based on a communication system. For example, the electronic device 101 may identify whether the state of the electronic device 101 related to the location is changed, based on a location of a WiFi router, a location of the electronic device 101 measured by a GPS, strength of a signal received through BT (or BLE), or a location of a base station of a network. The state of the electronic device 101 related to the location may include, for example, coordinates indicating the location of the electronic device 101 or a specific range indicating the location of the electronic device 101.

In various embodiments, the electronic device 101 may identify that a state of the electronic device 101 is changed, based on a usage pattern. For example, the electronic device 101 may acquire information on a time of a system related to the electronic device 101, based on a usage pattern related to time. In response to the acquired information on the time being changed, the electronic device 101 may identify that the state of the electronic device 101 is changed.

In operation 1403, the electronic device 101 may change at least one key to be displayed through a user interface. In various embodiments, the electronic device 101 may provide information on the first key from among the plurality of keys through the user interface. Based on the state of the electronic device 101 being changed, the electronic device 101 may identify the second key corresponding to the state of the electronic device 101 from among the plurality of keys. The electronic device 101 may determine the key to be displayed through the user interface as the second key based on the identification. The electronic device 101 may change the key to be displayed through the user interface from the first key to the second key.

In operation 1405, the electronic device 101 may display at least one visual object for indicating the at least one changed key. In various embodiments, the electronic device 101 may display a visual object for indicating the second key, in response to the second key to be displayed through the user interface being identified (or determined). The visual object may include an image, a photo, or an icon which is displayable through the display of the electronic device 101.

In various embodiments, operation 1405 may be omitted, and in this case, the electronic device 101 may provide a notification for indicating that the key to be provided through the key service is changed. The notification may include, for example, a notification emitting light through at least a portion of the electronic device 101. In another example, the notification may include a notification expressed by a sound or a vibration. The form of the notification is not limited to the above-described example.

In various embodiments, the electronic device 101 may provide information on the at least one changed key to the door-lock 300 in response to the at least one key being changed, irrespective of operation 1405. The electronic device 101 may automatically change the at least one key and provide the same, based on the state of the electronic device 101 being identified, such that convenience can be provided to the user.

Figure 15:
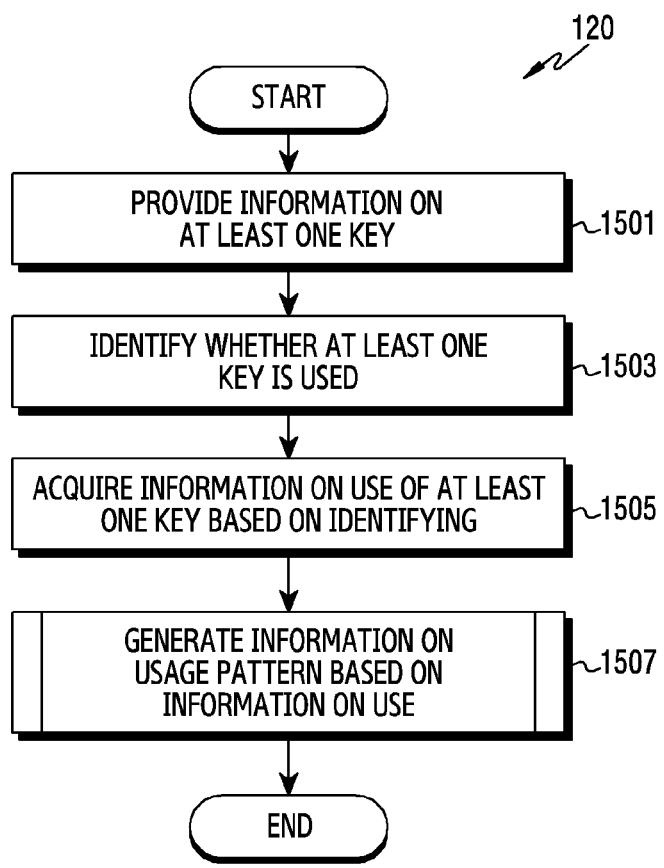
FIG. 15 is a view illustrating an example of an operation of an electronic device for generating information on a usage pattern according to various embodiments.

FIG. 15 is a view illustrating an example of an operation of an electronic device for generating information on a usage pattern according to various embodiments.

Referring to FIG. 15, in operation 1501, the electronic device 101 (for example, the processor 120) may provide information on at least one key. In various embodiments, the electronic device 101 may provide information on at least one key related to a key service. The at least one key may include a key that is selected based on data acquired through the communication module 190 or the sensor.

In operation 1503, the electronic device 101 may identify whether the at least one key (or information on the key) is used. The electronic device 101 may identify whether the at least one key is used to open the door-lock 300. According to various embodiments, the electronic device 101 may identify whether the at least one key is used, based on a user input or communication with the door-lock 300.

In various embodiments, the electronic device 101 may identify whether the at least one key is used based on a user input. For example, the electronic device 101 may display an icon for detecting an input for indicating that use of the at least one key is completed. The electronic device 101 may identify whether the at least one key is used, in response to a user input on the displayed icon being detected.

In various embodiments, the electronic device 101 may identify whether the at least one key is used based on communication with the door-lock 300. The electronic device 100 may provide the key service, based on bi-directional communication (for example, BLE, NFC) with the door-lock 300 or unidirectional communication (for example, magnetic secure transmission (MST)). The electronic device 101 may identify whether the at least one key is used, based on a communication method for providing the key service. In some embodiments, the electronic device 101 may provide the key service, based on the bi-directional communication. In this case, the electronic device 101 may receive information on whether the door-lock 300 is opened by the at least one key from the door-lock 300. The electronic device 101 may identify whether the at least one key is used, based on the received information. In some other embodiments, the electronic device 101 may provide the key service based on the unidirectional communication. In this case, the electronic device 101 may identify whether the door-lock 300 is opened through at least one sensor. The at least one sensor may include, for example, at least one of a gyro sensor for detecting a rotation state of the electronic device 101 based on three axes (for example, x-axis, y-axis or z-axis), an acceleration sensor for detecting a movement state of the electronic device 101 based on the three axes, or a sound recognition sensor for detecting a sound. The electronic device 101 may enter a mode for detecting information related to the electronic device 101 (for example, a movement of the electronic device 101, or an ambient sound of the electronic device 101) by using the at least one sensor, in response to the at least one key being provided. The electronic device 101 may acquire a sensor value related to the electronic device 101 by using the at least one sensor. The electronic device 101 may identify whether the door-lock 300 is opened (or the door-lock 300 is unlocked), based on the acquired sensor value. The electronic device 101 may identify whether the at least one key is used, based on it being identified whether the door-lock 300 is opened. For example, the electronic device 101 may identify that the electronic device 101 is moved toward the door-lock 300, based on the acceleration sensor. The electronic device 101 may identify that the door-lock 300 is opened and the at least one key is used, based on the movement of the electronic device 101.

In operation 1505, the electronic device 101 may acquire information on the use of the at least one key, based on it being identified whether the at least one key is used. The electronic device 101 may acquire information on the use of the at least one key, based on it being identified that the at least one key is used. The information on the use may include, for example, information (or an identifier) for identifying the at least one key, information on a time at which the at least one key is used, information on a place (for example, a latitude value or a longitude value) where the at least one key is used, or information on another key that is used before or after the at least one key is used.

In operation 1507, the electronic device 101 may generate information on a usage pattern based on the information on the use. The electronic device 101 may store the information on the use. In various embodiments, the electronic device 101 may store the information on the use based on various criteria. For example, the electronic device 101 may map and store the information on the use onto date, day, time, place or using sequence. The electronic device 101 may store the information on the use based on various criteria, thereby generating the information on the usage pattern. The various criteria may be criteria for distinguishing usage patterns. The information related to the usage pattern may be stored in the form of table 1 presented below:

TABLE 1

| Day | Time | | | | |
| --- | --- | --- | --- | --- | --- |
| | 8 o'clock | 11 o'clock | 14 o'clock | 17 o'clock | 20 o'clock |
| Monday-Friday | Car key | | | House key | |
| Saturday | | House key | Car key | | House key |
| Sunday | | Car key | | House key | |

Referring to table 1, the electronic device 101 may store information related to the usage pattern based on day or time. Table 1 illustrates a portion of the information related to the usage pattern and is not limited to the above-described example.

In various embodiments, the electronic device 101 may generate a usage pattern model, based on the information related to the use. The usage pattern model may be a functional configuration (or software) for determining (or predicting or inferring) a usage pattern regarding at least one key from among the plurality of keys. Based on the usage pattern model, the electronic device 101 may determine a usage pattern of at least one key according to a place, a usage pattern of at least one key according to time, or a usage pattern of at least one key according to a using sequence.

In various embodiments, after generating the information on the usage pattern, the electronic device 101 may update the information on the usage pattern in response to information related to use of at least one key being received. The electronic device 101 may update the information on the usage pattern by acquiring the information related to the use every time at least one key is used.

In various embodiments, at least some of the operations related to generation of the information on the usage pattern may be performed through the electronic device 101 and/or the server 108. For example, the server 108 may generate the information on the usage pattern, based on the information related to the use being received from the electronic device 101. The operation of generating the information on the usage pattern related to the server 108 will be described below through FIG. 16.

Figure 16:
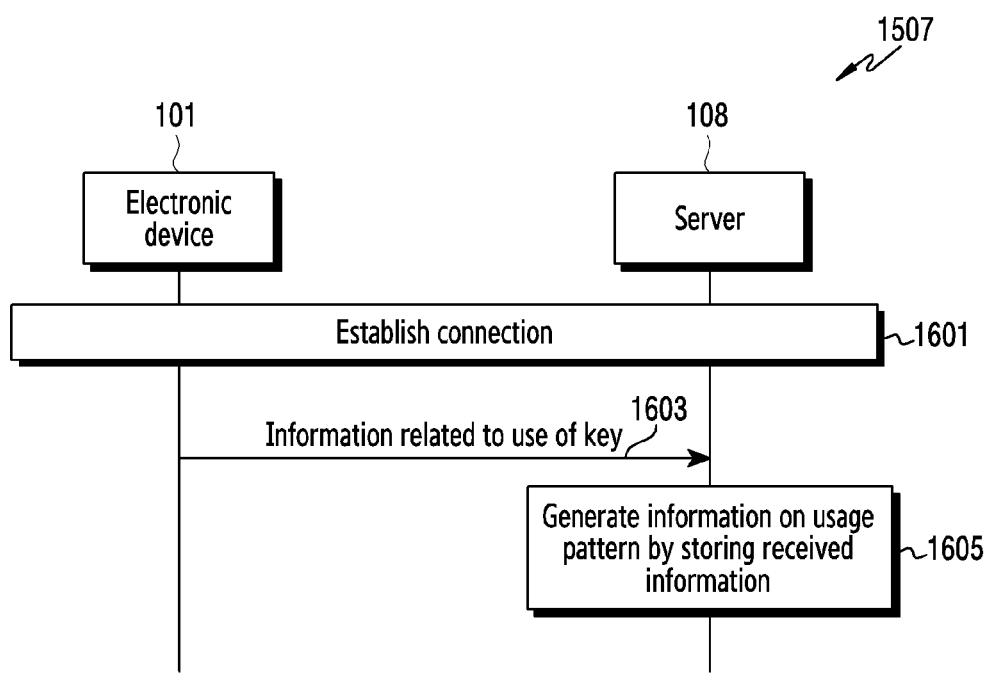
FIG. 16 is a view illustrating an example of a signal flow between an electronic device and a server to generate information on a usage pattern according to various embodiments.

Referring to FIG. 16, in operation 1601, the electronic device 101 may establish a connection between the electronic device 101 and the server 108 through the communication module 190. The electronic device 101 may be connected with the server 108 based on wireless or wired communication.

In operation 1603, the electronic device 101 may transmit information related to use to the server 108 from the electronic device 101. The electronic device 101 may transmit information related to use of at least one key to the server 108 from the electronic device 101.

In operation 1605, the server 108 may generate information on a usage pattern based on the received information. The server 108 may receive the information related to use of the at least one key from the electronic device 101. The server 108 may store the received information related to the use of the at least one key in a database. The server 108 may store the information related to the use based on various criteria. Various criteria for storing the information related to the use may include at least one of, for example, date, day, time, place or using sequence. The server 108 may map and store the information related to the use onto at least one of the date, day, time, place, or using sequence. The server 108 may generate the information on the usage pattern, by mapping and storing the information related to the use onto the various criteria.

In various embodiments, the server 108 may generate a usage pattern model based on the information related to the use. The usage pattern model may be a functional configuration for determining a usage pattern regarding at least one key of the plurality of keys. Based on the usage pattern model, the server 108 may determine a usage pattern of at least one key according to a place, a usage pattern of at least one key according to time, or a usage pattern of at least one key according to a using sequence.

In various embodiments, after generating the information on the usage pattern, the server 108 may update the information on the usage pattern in response to information related to use of at least one key being received. The server 108 may update the information on the usage pattern by acquiring information related to use every time at least one key is used.

According to various embodiments, the electronic device 101 may identify at least one key for providing a final key service based on a state of the electronic device 101. By doing so, the electronic device 101 can automatically provide information on a key without an additional user input.

In various embodiments, a method of an electronic device 101 may include: identifying that a state of the electronic device 101 related to at least one of a plurality of door-locks interlocking with the electronic device 101 is changed; based on the identifying, changing at least one electronic key to be displayed through a UI from among a plurality of electronic keys for unlocking the plurality of door-locks, respectively; and displaying at least one visual object for indicating the at least one changed electronic key through the UI.

In various embodiments, the state of the electronic device 101 may include at least one of a state regarding a connection between at least one of the plurality of door-locks and the electronic device 101, and a state related to a location of the electronic device 101 or a usage pattern of the plurality of door-locks of the electronic device 101.

In various embodiments, the method of the electronic device 101 may further include: transmitting a signal for requesting information on an electronic key of at least one of the plurality of door-locks to a server, based on the state of the electronic device; and changing at least one electronic key to be displayed through the UI, based on the information on the at least one electronic key being received from the server.

In various embodiments, the method of the electronic device 101 may further include: identifying strength of each of a plurality of signals related to a plurality of door-locks, respectively, in response to there existing the plurality of door-locks that interlock with the electronic device 101; identifying a door-lock 300 regarding a signal having greatest strength from among the plurality of signals related to the plurality of door-locks, respectively; acquiring information on an electronic key related to the door-lock 300 identified as having the greatest signal strength; and displaying the electronic key related to the door-lock 300 identified as having the greatest signal strength through the UI.

In various embodiments, the method of the electronic device 101 may further include: based on there not existing the plurality of door-locks that interlock with the electronic device 101, acquiring information on a location of the electronic device based on a GPS sensor or a network; identifying information on an electronic key related to the location of the electronic device 101, based on the acquired information; and displaying the electronic key related to the location of the electronic device 101 through the UI.

In various embodiments, the method of the electronic device 101 may further include: identifying wherein the information on the electronic key related to the location of the electronic device 101 is obtainable, based on the acquired information; in response to the information on the electronic key related to the location not being obtainable, acquiring information on a usage pattern of the plurality of electronic keys; based on the acquired information on the usage pattern, identifying information on an electronic key related to the usage pattern from among the plurality of electronic keys; and displaying the electronic key related to the usage pattern through the UI, based on the identifying.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Embodiments disclosed the detailed descriptions and the drawings of the disclosure only suggest specific examples to assist in explaining and easily understanding the contents of the disclosure, and are not intended to limit the scope of the disclosure. Therefore, the scope of the disclosure will be construed as including not only the embodiments disclosed herein, but also all changes derived based on the technical concept of the disclosure or changed forms.

The invention claimed is:

1. An electronic device comprising:
   a touchscreen display;
   a wireless communication circuit;
   a location detection sensor;
   a memory storing information on a plurality of electronic keys used to unlock a plurality of door-locks;
   at least one processor operatively connected with the touchscreen display, the wireless communication circuit, the location detection sensor, and the memory; and
   a memory operatively connected with the processor,
   wherein the memory stores instructions that, when executed, cause the processor to:
      acquire information on the plurality of door-locks through the wireless communication circuit, wherein the information on the plurality of door-locks comprises information on strength of signals received from the plurality of door-locks;
      identify whether information on a key related to the information on the plurality of door-locks is acquired;
      in response to failing to acquire the information on the key related to the information on the plurality of door-locks, acquire information on a location of the electronic device using the location detection sensor;
      identify whether information on a key related to the information on the location is acquired;
      in response to failing to acquire the information on the key related to the information on the location, acquire information on a usage pattern of the plurality of electronic keys;
      based on the information on the usage pattern, select a first key from the plurality of electronic keys; and
      display a first graphic user interface (GUI) related to the selected first key in order to make the first key be used or selected by a user input.

2. The electronic device of claim 1, wherein the instructions, when executed, cause the processor to:
   display an entirety of the first GUI on the touchscreen display;
   display a portion of a second GUI associated with a second key from among the plurality of electronic keys on the touchscreen display; and
   display a portion of a third GUI related to a third key from among the plurality of electronic keys on the touchscreen display.

3. The electronic device of claim 2, wherein the instructions, when executed, cause the processor to:
   receive a gesture input in a first direction from the first GUI to the second GUI through the touchscreen display; and
   provide a scrolling effect for changing display of the first GUI to display of the second GUI.

4. The electronic device of claim 3, wherein the instructions, when executed, cause the processor to:
   receive a gesture input in a second direction from the first GUI to the third GUI through the touchscreen display, the second direction being opposite to the first direction; and
   provide a scrolling effect for changing display of the first GUI to display of the third GUI.

5. The electronic device of claim 1, wherein the instructions, when executed, cause the processor to:
   in response to acquiring the information on the key related to the information on the plurality of door-locks, select a first key from the plurality of electronic keys, based on the information on the key related to the information on the plurality of door-locks.

6. The electronic device of claim 1, wherein the instructions, when executed, cause the processor to:
   in response to acquiring the information on the key related to the information on the location, select a first key from the plurality of electronic keys, based on the information on the key related to the information on the location.

7. The electronic device of claim 1, wherein the location detection sensor comprises at least one of a GPS communication module, a WiFi communication module, or a biometric sensor.

8. A method of an electronic device storing information on a plurality of electronic keys used to unlock a plurality of door-locks, the method comprising:
   acquiring information on the plurality of door-locks through a wireless communication circuit of the electronic device, wherein the information on the plurality of door-locks comprises information on strength of signals received from the plurality of door-locks;
   identifying whether information on a key related to the information on the plurality of door-locks is acquired;
   in response to failing to acquire the information on the key related to the information on the plurality of door-locks, acquiring information on a location of the electronic device using a location detection sensor of the electronic device;
   identifying whether information on a key related to the information on the location is acquired;
   in response to failing to acquire the information on the key related to the information on the location, acquiring information on a usage pattern of the plurality of electronic keys;
   based on the information the usage pattern, selecting a first key from the plurality of electronic keys; and
   displaying a first graphic user interface (GUI) related to the selected first key in order to make the first key be used or selected by a user input.

* * * * *